(12) United States Patent
Omori et al.

(10) Patent No.: US 11,069,039 B2
(45) Date of Patent: Jul. 20, 2021

(54) IMAGE PROCESSING APPARATUS, IMAGING APPARATUS, IMAGE PRINTING APPARATUS, METHOD FOR CONTROLLING IMAGE PROCESSING APPARATUS, AND IMAGE PROCESSING PROGRAM

(71) Applicant: SHARP KABUSHIKI KAISHA, Sakai (JP)

(72) Inventors: Keisuke Omori, Sakai (JP); Kei Tokui, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 45 days.

(21) Appl. No.: 16/607,036

(22) PCT Filed: Jan. 18, 2018

(86) PCT No.: PCT/JP2018/001418
§ 371 (c)(1),
(2) Date: Oct. 21, 2019

(87) PCT Pub. No.: WO2018/193677
PCT Pub. Date: Oct. 25, 2018

(65) Prior Publication Data
US 2020/0051221 A1    Feb. 13, 2020

(30) Foreign Application Priority Data
Apr. 21, 2017   (JP) .............................. JP2017-084787

(51) Int. Cl.
*G06K 9/00*   (2006.01)
*G06T 5/00*   (2006.01)
(Continued)

(52) U.S. Cl.
CPC ................ *G06T 5/006* (2013.01); *G06T 3/40* (2013.01); *G06T 5/20* (2013.01); *G06T 2207/30201* (2013.01)

(58) Field of Classification Search
CPC .. G06T 5/006; G06T 5/20; G06T 3/40; G06T 2207/30201
See application file for complete search history.

(56) References Cited

U.S. PATENT DOCUMENTS 8,049,788 B2 * 11/2011 Watarai .................... H04N 9/68
                                                      348/222.1
8,494,230 B2 *  7/2013 Kobayashi ............ G06T 3/0093
                                                      382/118
(Continued)

FOREIGN PATENT DOCUMENTS

JP    2008-242921 A    10/2008
JP    2009-151825 A     7/2009
(Continued)

*Primary Examiner* — Shefali D Goradia
(74) *Attorney, Agent, or Firm* — ScienBiziP, P.C.

(57) ABSTRACT

An image is processed appropriately even in a case that the image includes multiple correction areas. In a case of performing the correction processing for each of a first correction area and a second correction area, a controller (40) determines whether to perform suppression processing of suppressing the correction processing for at least one of the first correction area or the second correction area depending on a distance between the inner area of the first correction area and the inner area of the second correction area.

9 Claims, 19 Drawing Sheets

(51) Int. Cl.
*G06T 3/40* (2006.01)
*G06T 5/20* (2006.01)

(56) References Cited

U.S. PATENT DOCUMENTS

| | | | |
|---|---|---|---|
| 9,756,241 B2 * | 9/2017 | Omori | H04N 5/232133 |
| 10,812,678 B2 * | 10/2020 | Omori | G06T 1/00 |
| 2009/0060384 A1 * | 3/2009 | Hayaishi | G06K 9/00248 |
| | | | 382/282 |
| 2010/0054620 A1 * | 3/2010 | Kobayashi | G06T 3/0093 |
| | | | 382/256 |

FOREIGN PATENT DOCUMENTS

| | | |
|---|---|---|
| JP | 2010-166624 A | 7/2010 |
| JP | 2010-170219 A | 8/2010 |

* cited by examiner

IMAGE PROCESSING APPARATUS, IMAGING APPARATUS, IMAGE PRINTING APPARATUS, METHOD FOR CONTROLLING IMAGE PROCESSING APPARATUS, AND IMAGE PROCESSING PROGRAM

TECHNICAL FIELD

An aspect of the present invention relates to an image processing apparatus performing a correction for reducing or enlarging a part of an image.

BACKGROUND ART

Techniques are known in which an impression of an imaging object is changed by performing image processing to enlarge or reduce a part of an image. For example, these techniques include a technique for correcting the face of a person in the image so as to make the face smaller to provide an impression of a small face, a technique for correcting the whole body of a person in the image so as to make the whole body thinner to provide an impression of a slender body, and a technique for correcting the legs of a person in the image so as to make the legs longer to provide an impression of a good figure.

PTL 1 describes an image processing apparatus deforming a part of an image, in which, in a case that multiple deformation areas overlap, a priority is configured for each of the deformation areas. Deformation processing is not performed for deformation areas with lower priorities or is performed in order of decreasing priority.

CITATION LIST

Patent Literature

PTL 1: JP 2008-242921 A

SUMMARY OF INVENTION

Technical Problem

However, the image processing apparatus described in PTL 1 poses the following problems. (a) of FIG. 20 illustrates an example of an input image (input image 2000) not yet corrected by the image processing apparatus, and (b) of FIG. 20 illustrates an example of the output image (output image 2003) deformed by the image processing apparatus. The input image 2000 includes faces 2001 and 2002 of persons. The face 2001 is larger than the face 2002, and thus a deformation area including the face 2001 has a higher priority than a deformation area including the face 2002. As a result, for example, deformation processing (small-face processing) is performed only on the face 2001, and no deformation processing (small-face processing) is performed on the face 2002. In this way, the small face 2002 is not only excluded from small-face processing, but is also deformed into an unfavorable face 2005 with the right side extended under the effect of deformation of the face 2001.

Thus, there is a demand for a technique capable of appropriately processing an image even in a case that the image contains multiple correction areas.

In view of the foregoing, an object of an aspect of the present invention is to provide an image processing apparatus, an imaging apparatus, an image printing apparatus, a method for controlling an image processing apparatus, and an image processing program that are capable processing an image even in a case that the image contains multiple correction areas.

Solution to Problem

An image processing apparatus according to an aspect of the present invention includes a correction processing unit configured to perform correction processing on one or more correction areas in an image. Each of the one or more correction areas includes an inner area and an outer area outside the inner area. In the correction processing, the inner area is reduced, and the outer area is enlarged, or the inner area is enlarged, and the outer area is reduced. In a case of performing the correction processing for each of a first correction area and a second correction area, the correction processing unit determines whether to perform suppression processing of suppressing the correction processing for at least one of the first correction area or the second correction area depending on a distance between the inner area of the first correction area and the inner area of the second correction area.

A method for controlling an image processing apparatus according to an aspect of the present invention includes the step of performing correction processing on one or more correction areas in an image. Each of the one or more correction areas includes an inner area and an outer area outside the inner area. In the correction processing, the inner area is reduced, and the outer area is enlarged, or the inner area is enlarged, and the outer area is reduced. In the step of correction processing, in a case that the correction processing is performed on each of a first correction area and a second correction area, whether to perform suppression processing of suppressing the correction processing for at least one of the first correction area or the second correction area is determined depending on a distance between the inner area of the first correction area and the inner area of the second correction area.

Advantageous Effects of Invention

According to an aspect of the present invention, an image can be appropriately processed even in a case that the image contains multiple correction areas.

DESCRIPTION OF EMBODIMENTS

First Embodiment

An image processing apparatus according to a first embodiment of the present invention will be described with reference to FIG. 1 to FIG. 12. The image processing apparatus according to the present embodiment is an apparatus for correcting an image including a face as an imaging object to reduce or enlarge an area corresponding to the face.

Configuration of Image Processing Apparatus

Figure 1:
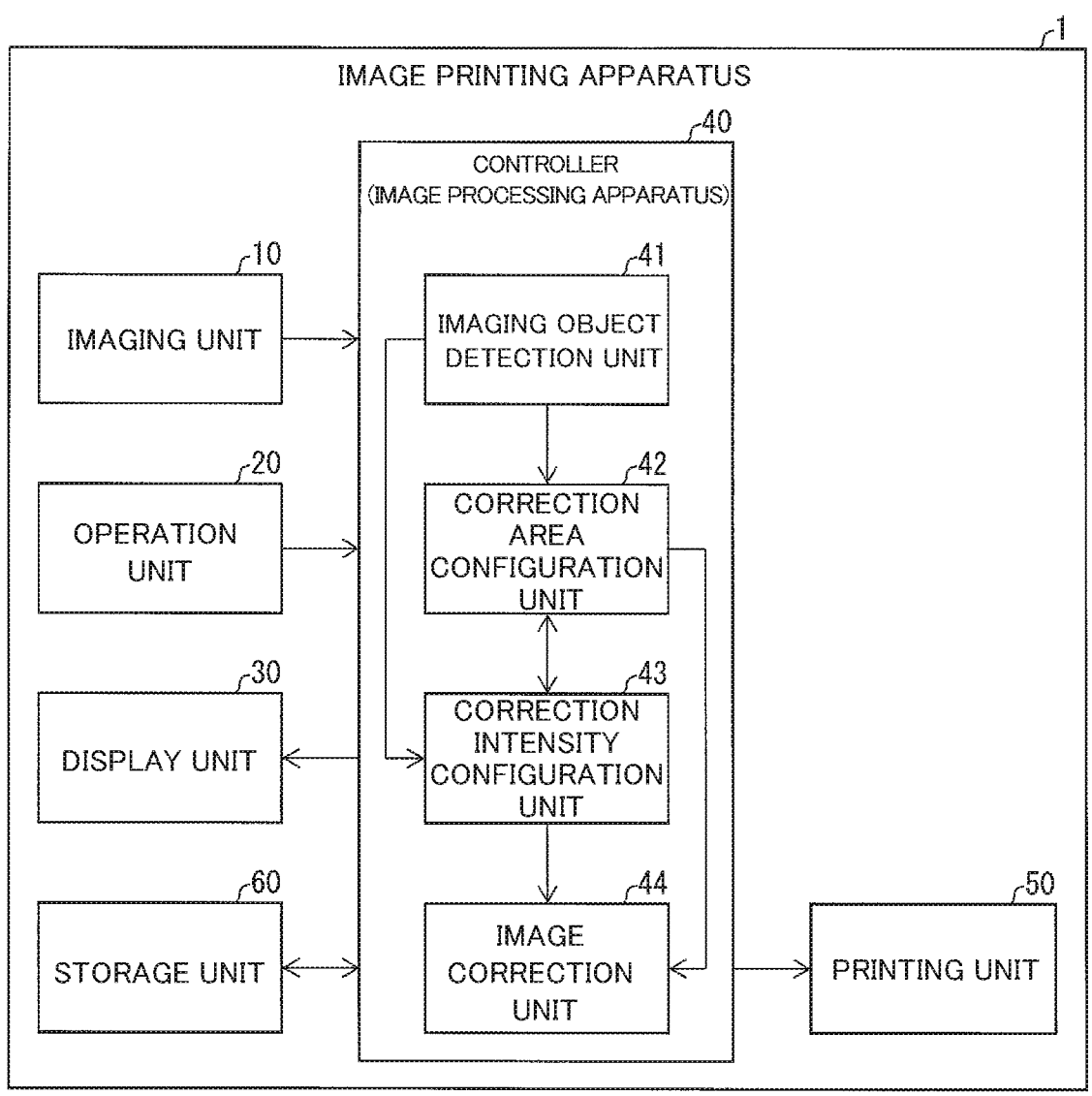
FIG. 1 is a block diagram illustrating a configuration of an image printing apparatus according to an embodiment of the present invention.

First, based on FIG. 1, an example of a configuration of an image printing apparatus 1 will be described in which an image processing apparatus of the present embodiment is incorporated as a controller 40. FIG. 1 is a functional block diagram illustrating the configuration of the image printing apparatus 1 in the present embodiment. As illustrated in FIG. 1, the image printing apparatus 1 includes an imaging unit 10, an operation unit 20, a display unit 30, a controller (image processing apparatus) 40, a printing unit 50, and a storage unit 60.

The imaging unit 10 captures an image of an imaging object, and transmits the captured image as an input image to the controller 40.

The operation unit 20 receives a user input, and is implemented by, for example, a touch panel and a mouse. For example, in a case that the operation unit 20 is a touch panel, the input image is displayed on the display unit 30 provided with the touch panel.

The display unit 30 displays various images. The display unit 30 displays, for example, the image captured by the imaging unit 10 or an output image generated by an image correction unit 44 described below.

The controller 40 functions as an image processing apparatus that performs image processing for the image (input image) captured by the imaging unit 10, and generates an output image resulting from processing (resulting from correction). In the present embodiment, the controller 40 also functions as a controller that integrally controls the image printing apparatus 1. A specific configuration of the controller 40 will be described below.

The printing unit 50 prints the output image (image) generated by the processing of the controller 40. The printing unit 50 may print an image drawn by the user via the operation unit 20 further on the output image.

The storage unit 60 is configured to store various control programs and the like performed by the controller 40, for example, and includes a non-volatile storage apparatus such as a hard disk and a flash memory. The storage unit 60 stores the input image and the output image, for example. The storage unit 60 may store parameters and the like necessary for the processing of the controller 40, such as the image processing (correction processing), imaging object detection processing, and the like.

Note that the controller that controls the image printing apparatus 1 need not necessarily be the controller 40. For example, an external apparatus capable of being communicatively coupled to the image printing apparatus 1 may function as the controller 40.

Configuration of Controller (Image Processing Apparatus)

Figure 2:
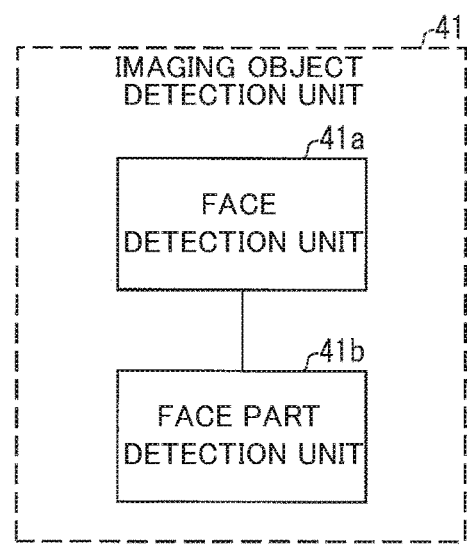
FIG. 2 is a block diagram illustrating a configuration of an imaging object detection unit included in an image processing apparatus of the image printing apparatus illustrated in FIG. 1.

Now, a configuration of the controller 40 will be described with reference to FIGS. 1 and 2. FIG. 2 is a block diagram illustrating a configuration of an imaging object detection unit (target detection unit) 41 included in the controller 40.

As illustrated in FIG. 1, the controller 40 includes the imaging object detection unit 41, a correction area configuration unit 42, a correction intensity configuration unit 43, and an image correction unit 44. The correction area configuration unit 42, the correction intensity configuration unit 43, and the image correction unit 44 may be collectively referred to as a correction processing unit.

An image including the face of a person as an imaging object is input to the controller 40. An image that includes the face of a person as an imaging object and that is input to the controller 40 is described as an "input image" below.

The imaging object detection unit 41 detects an imaging object (target area) to be corrected from the input image input to the controller 40. As illustrated in FIG. 2, for example, the imaging object detection unit 41 can be configured to include a face detection unit 41a and a face part detection unit 41b. The face detection unit 41a is configured to detect an area corresponding to the face (hereinafter, also simply referred to as a "face") in the input image. Note that detection of the area corresponding to the face can be performed using a known algorithm (for example, using skin color information detected from the input image, or the like), and is thus not described in detail here. The face part detection unit 41B is configured to detect parts of the face such as the eyes (right eye and left eye), mouth, eyebrows (right eyebrow and left eyebrow), and nose or areas corresponding to contours of the face or the like (hereinafter also simply referred to as "face parts", including the areas corresponding to the contours). In the present embodiment, the face part detection unit 41b detects the right eye, the left eye, and the mouth. Note that detection of the area corresponding to each face part can be performed using a known algorithm (for example, using pattern-matching, or the like), and thus, is not described in detail here.

Note that detection of an imaging object by the imaging object detection unit 41 may be manually performed. In other words, a user may detect an imaging object from an input image. In this case, for example, the imaging object detection unit 41 (imaging object selection unit) causes the display unit 30 to display the input image, and detects (selects) an imaging object to be corrected specified by the user input via the operation unit 20. In a case that multiple imaging objects are present in the input image, the imaging object detection unit 41 selects an imaging object to be corrected, based on the user input. For example, in a case that the operation unit 20 is a touch panel, the user touches the touch panel to select from imaging objects in the input image displayed by the display unit 30. In a case that the operation unit 20 is a mouse, the imaging object is selected, based on a mouse operation. In a case that the display and the mouse are connected to the controller 40, the user can select an imaging object by using the mouse. In this case, the controller 40 displays the input image on the display, and the user points to any of the imaging objects displayed on the display using a mouse cursor. The controller 40 considers the imaging object pointed to using the mouse cursor as the imaging object selected by the user.

In the description herein, correction processing is assumed to be performed on an image captured by the imaging unit 10 (i.e., an image including the imaging object). Specifically, in the description, reduction and enlargement processing is assumed to be performed on the imaging object included in the image. However, the present invention is not limited to this, and the image to be corrected need not be an image captured by the imaging unit 10. In this case, the imaging object detection unit 41 detects a target object to be corrected (in other words, the target area including the target object) included in the image. In other words, the imaging object detection unit 41 functions as a target area detection unit detecting the target area including the imaging object included in the image or the target object other than the imaging object (in other words, the target area included in the image). Note that the number of imaging objects detected by the imaging object detection unit 41 is not particularly limited, and that the imaging object detection unit 41 is capable of detecting one or more imaging objects.

The correction area configuration unit 42 is a component configuring a correction area, based on positions of the face and the face parts detected by the imaging object detection unit 41. In the present embodiment, the correction area configuration unit 42 configures the correction area, based on the positions of the face and the face parts detected by the imaging object detection unit 41. The correction area includes an inner area and an outer area.

Here, the inner area of the correction area is an area including a face in the input image. For example, the inner area can be an area with a prescribed shape having a position corresponding to the center of the face and a size corresponding to the size of the face. In the present invention, the inner area is a circular area defined as a set of pixels for which a distance from a correction center corresponding to the center of the face to each pixel is shorter than or equal to a first correction distance d1 corresponding to the size of the face. In other words, the inner area is a circular area having a central position coinciding with the correction center and having a radius (size) equal to the first correction distance d1 position.

The outer area of the correction area is an area surrounding the inner area in the input image. In the present embodiment, the outer area is an annular area defined as a set of pixels each having a distance from the correction center that is longer than the first correction distance d1 and shorter than or equal to a predetermined second correction distance d2 (d2>d1). For example, in a case that a correction is performed to make the face appear smaller, the inner area is to be reduced, and the outer area is to be enlarged. In contrast, in a case that a correction is performed to make the face appear larger, the inner area is to be enlarged, and the outer area is to be reduced. Note that specific examples of correction area configuration processing performed by the correction area configuration unit 42 will be described below with reference to different drawings.

The correction intensity configuration unit 43 is a component for configuring enlargement/reduction ratios α and β respectively for the inner area and the outer area configured by the correction area configuration unit 42. For example, in a case that a correction is made to make the face appear smaller, the correction intensity configuration unit 43 configures the enlargement/reduction ratio α for the inner area to a positive constant smaller than 1, and configures the enlargement/reduction ratio β for the outer area to a positive constant greater than 1. In contrast, in a case that the correction is performed to make the face appear larger, the correction intensity configuration unit 43 configures the enlargement/reduction ratio α for the inner area to a positive constant α greater than 1, and configures the enlargement/reduction ratio β for the outer area to a positive constant smaller than 1. The correction intensity configuration unit 43 configures (1) the enlargement/reduction ratio α and β for the inner area and the outer area to preset values, values specified by the user, or the like, and then (2) performs a correction based on the face and the face parts detected by the imaging object detection unit 41. Details of the correction of the enlargement/reduction ratios α and β will be described below with reference to different drawings.

The image correction unit 44 is a component for performing correction processing for the inner area and the outer area configured by the correction area configuration unit 42, in accordance with the enlargement/reduction ratios α and β configured by the correction intensity configuration unit 43. An example of the correction processing performed on the input image by the image correction unit 44 includes (1) correction processing of reducing the inner area configured by the correction area configuration unit 42 with the enlargement/reduction ratio α (α<1) configured by the correction intensity configuration unit 43, and enlarging the outer area configured by the correction area configuration unit 42 with the enlargement/reduction ratio β (β>1) configured by the correction intensity configuration unit 43, or (2) correction processing of enlarging the inner area configured by the correction area configuration unit 42 with the enlargement/reduction ratio α (α>1) configured by the correction intensity configuration unit 43, and reduce the outer area configured by the correction area configuration unit 42 with the enlargement/reduction ratio β (β<1) configured by the correction intensity configuration unit 43. Note that specific examples of the image correction processing performed by the image correction unit 44 will described below with reference to different drawings.

The storage unit 105 stores, for example, the input image and the output image (that is an image obtained by performing the correction processing described above on the input image). The storage unit 105 may store various parameters referenced by the imaging object detection unit 41, the correction area configuration unit 42, the correction intensity configuration unit 43, and the image correction unit 44 in a case of performing the processing described above.

Flow of Image Processing

Figure 3:
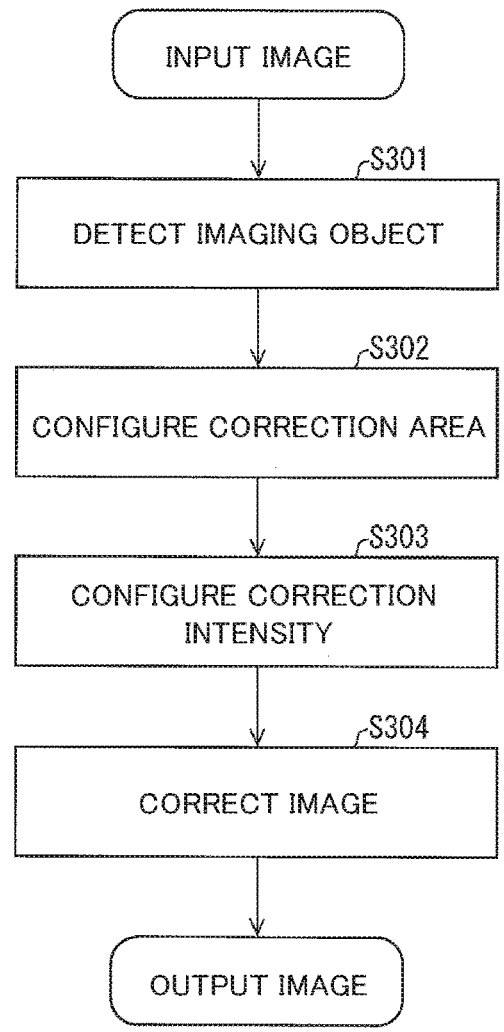
FIG. 3 is a flowchart illustrating a flow of image processing performed by the image processing apparatus illustrated in FIG. 2.

Now, a flow of the image processing performed by the controller 40 will be described with reference to FIG. 3. FIG. 3 is a flowchart illustrating the flow of the image processing performed by the controller 40.

As illustrated in FIG. 3, the image processing performed by the controller 40 includes imaging object detection processing S301, correction area configuration processing S302, correction intensity configuration processing S303, and image correction processing S304.

In a case that an input image is provided to the controller 40, the imaging object detection processing S301 is performed. The imaging object detection processing S301 is processing of detecting a face and face parts of a person included as images in the input image, and is performed by the imaging object detection unit 41 in the present embodiment.

After completion of the imaging object detection processing S301, the correction area configuration processing S302 is performed. The correction area configuration processing S302 is processing of configuring the correction area (the inner area and the outer area), based on the face and face parts detected in the imaging object detection processing S301, and is performed by the correction area configuration unit 42 in the present embodiment.

After completion of the correction area configuration processing S302, the correction intensity configuration processing S303 is performed. The correction intensity configuration processing S303 is processing of configuring the enlargement/reduction ratios α and β for the inner area and the outer area of the correction area configured in the correction area configuration processing S302, and is performed by the correction intensity configuration unit 43 in the present embodiment.

In a case that the correction intensity configuration processing S303 is completed, the image correction processing S304 is performed. The image correction processing S304 is processing of reducing or enlarging the inner area and the outer area of the correction area configured in the correction area configuration processing S302 with the enlargement/reduction ratios α and β configured in the correction intensity configuration processing S303, and is performed by the image correction unit 44 in the present embodiment.

Note that the number of correction areas in the input image is not particularly limited and may be one or more. The correction processing unit may reduce each of the inner areas and enlarge each of the outer areas, in some or all of the correction areas, or may enlarge each of the inner areas and reduce each of the outer areas, in some or all of the correction areas.

Specific Example of Correction Area Configuration Processing

Now, a specific example of the correction area configuration processing S302 performed by the correction area configuration unit 42 will be described with reference to FIG. 4 and FIG. 5.

As described above, the face parts (such as cheeks, and chin) defining the facial contour are likely to fail to be detected or likely to be erroneously detected. Thus, the correction area configuration processing S302 according to the present embodiment is performed with reference to the positions of the face parts other than the face parts defining the facial contour, specifically, the positions of three face parts of the left eye, the right eye, and the mouth.

Figure 4:
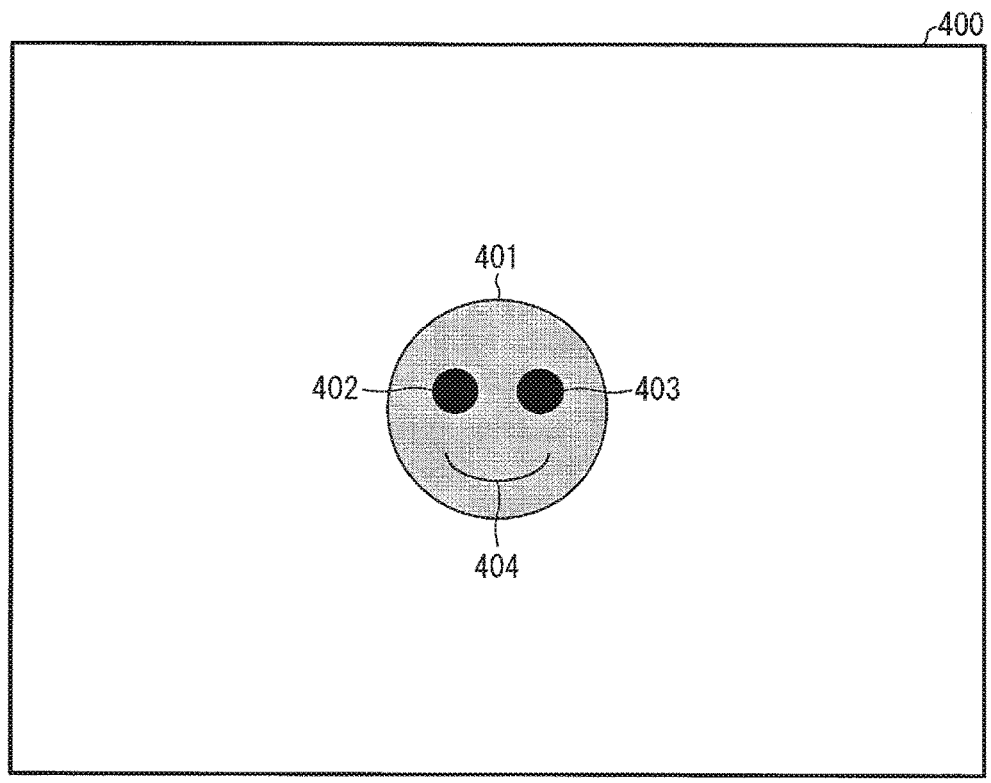
FIG. 4 is a diagram illustrating an example of an input image including a face of a person as an imaging object.

FIG. 4 is a diagram illustrating an input image 400 including a face 401 of a person as an imaging object. The input image 400 illustrated in FIG. 4 includes a left eye 402, a right eye 403, and a mouth 404 as imaging objects. Positions of the left eye 402, right eye 403, and mouth 404 detected by the imaging object detection unit 41 are respectively expressed as follows.

Position of left eye 402: (LEFT_x, LEFT_y),
Position of right eye 403: (RIGHT_x, RIGHT_y), and
Position of mouth 404: (MOUTH_x, MOUTH_y).

A center of the face 401 approximately coincides with a center of gravity of the left eye 402, right eye 403, and mouth 404. Thus, the correction area configuration unit 42 calculates a correction centers=(cx, cy) representing the center of the face from the positions of the left eye 402, right eye 403, and mouth 404 in accordance with the following Equations (1) and (2).

$$cx=(LEFT\_x+RIGHT\_x+MOUTH\_x)/3 \quad (1)$$

$$cy=(LEFT\_y+RIGHT\_y+MOUTH\_y)/3 \quad (2)$$

A size of the face is approximately proportional to a distance dist_eye between eyes (distance between the right eye 403 and the left eye 404). Thus, the correction area configuration unit 42 calculates the first correction distance d1 corresponding to the size of the face from the positions of the left eye 402 and right eye 403 in accordance with following Equations (3) and (4).

$$dist\_eye=\{(LEFT\_x-RIGHT\_x)^2+(LEFT\_y-RIGHT\_y)^2\}^{1/2} \quad (3)$$

$$d1=dist\_eye \times param\_A \quad (4)$$

In Equation (4), param_A represents a proportionality factor configured in advance.

Figure 5:
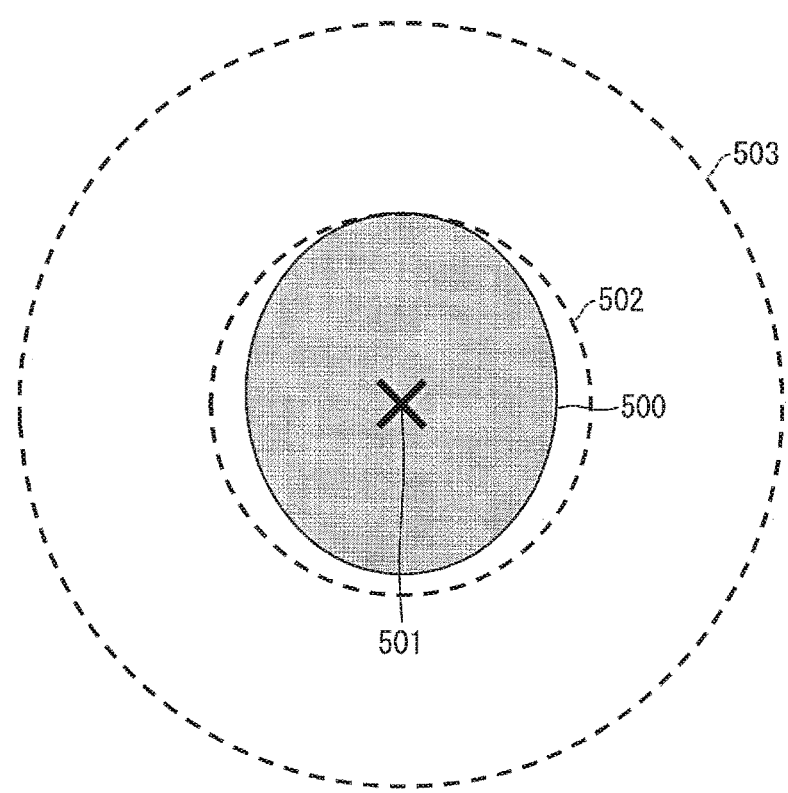
FIG. 5 is a diagram illustrating an example of a correction area configured based on a right eye, a left eye, and a mouth each included as an imaging object in the input image illustrated in FIG. 4.

Subsequently, as illustrated in FIG. 5, the correction area configuration unit 42 configures the inner area 502 including the face 500 and the outer area 503, which is the area outside the inner area 502. Here, the inner area 502 is a circular area defined as a set of pixels each having a distance from the correction center 501 that is shorter than or equal to the first correction distance d1. On the other hand, the outer area 503 is a circular ring area defined as a set of pixels each having a distance from the correction center that is longer than the first correction distance d1 and shorter than or equal to the second correction distance d2 (d2>d1). In a case that a correction is performed to make the face appear smaller, the inner area 502 is to be reduced and the outer area 503 is to be enlarged. In contrast, in the case that a correction is performed to make the face appear larger, the inner area 502 is to be enlarged and the outer area 503 is to be reduced.

The second correction distance d2 may be calculated according to Equation (5) below, for example.

$$d2=d1 \times param\_B \quad (5)$$

In Equation (5), param_B represents a predetermined proportionality factor (where param_B>1). For example, assuming that param_B=2.0, the second correction distance d2 is twice the first correction distance d1, and a width (a difference between an outer diameter and an inner diameter) of the outer area 503 is equal to a radius of the inner area 502.

Note that the actual face 500 of a person is not a circle, and thus an outer circumference of the inner area 502 does not coincide with a contour of a face 500. However, by appropriately configuring the factor param_A appearing in Equation (4), the contour of the face 500 can be accurately approximated from the outer circumference of the inner area 502. In fact, there is a significant correlation between the distance between eyes and the size of the face. Thus, by measuring the ratio of the size of the face to the distance between eyes for multiple people and configuring the factor param_A to an average value of the measured ratios, the contour of the face 500 can be accurately approximated from the outer circumference of the inner area 502. Note that, in a case that a person that may be an imaging object is limited to a person having a specific attribute (age, gender, or the like), a person as a sample for configuring the factor param_A as described above is preferably limited to a person having that attribute. Thus, the difference between the outer circumference of the inner area 502 and the contour of the face 500 can be made smaller than in a case that the sample for configuring the factor param_A is not limited.

Specific Example of Image Correction Processing

Next, a specific example of the image correction processing S304 (correction processing) performed by the image correction unit 44 will be described with reference to FIG. 6 and FIG. 7.

The correction performed on the correction area in the image correction processing S304 is a correction for (1) reducing the inner area in an isotropic manner and (2) enlarging the outer area in an isotropic manner. More specifically, this correction involves transferring a point P=(r cos θ, r sin θ)+(c1, c2), where r represents a distance from the correction center and θ represents a direction viewed from the correction center=(c1, c2), to (1) a point P'=(r' cos θ, r' sin θ)+(c1, c2) in a case of r≤d1, where the distance from the correction center is r'=αr and the direction viewed from the correction center is θ, and to (2) a point P'=(r' cos θ, r' sin θ)+(c1, c2) in a case of d1<r≤d2, where the distance from the correction center is r'=βr−(β−α)d1 and the direction viewed from the correction center is θ. Here, α represents a positive constant configured by the correction intensity configuration unit 43 as the enlargement/reduction ratio for the inner area, and satisfies α<1. On the other hand, β represents a positive constant configured by the correction intensity configuration unit 43 as the enlargement/reduction ratio for the outer area, is defined by β=(d2−αd1)/(d2−d1), and satisfies β>1.

Figure 6:
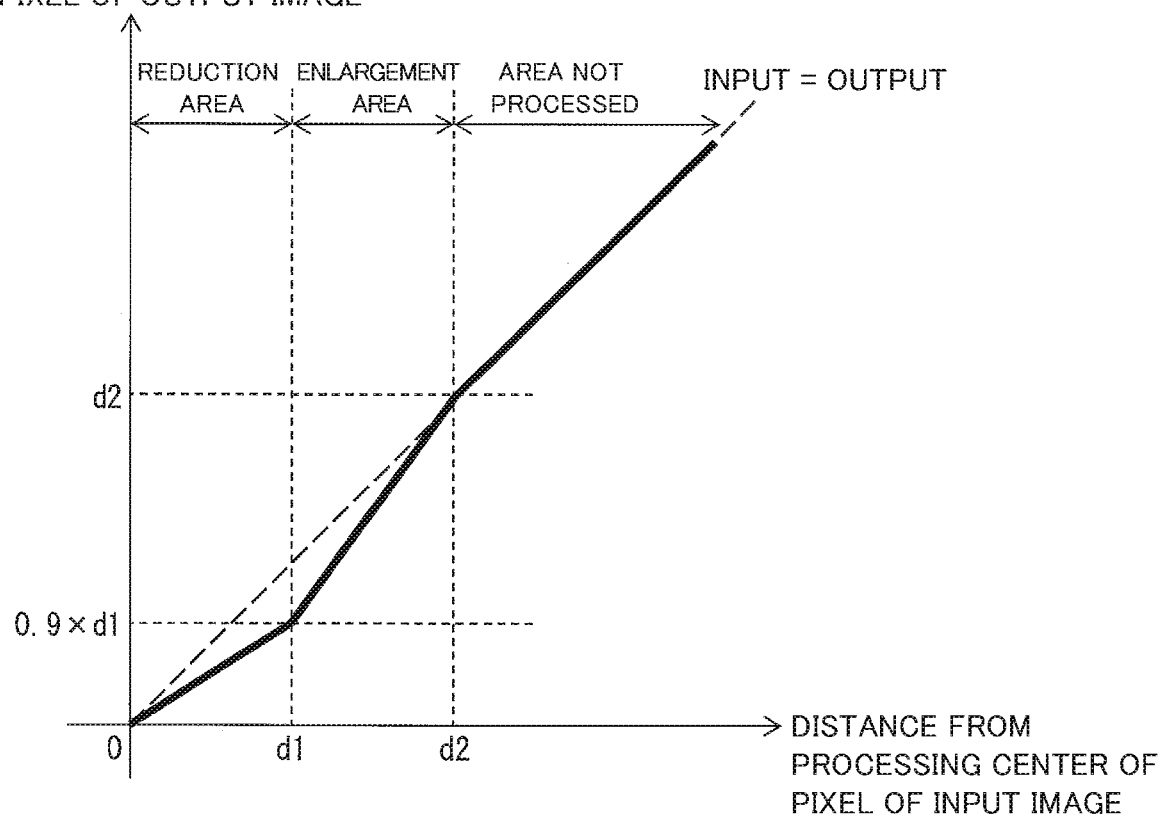
FIG. 6 is a graph illustrating, for image correction processing, a relationship between a distance from a correction center of an uncorrected point and a distance from a correction center of a corrected point.

For example, in a case of α=0.9 and β=1.1 (d2=2d1), a relationship between the distance r from the correction center of the uncorrected point P and the distance r' from the correction center of the corrected point P is as a graph illustrated in FIG. 6. In this case, displacement due to the correction is illustrated as arrows as in FIG. 7. In FIG. 7, a starting point of each arrow indicates the uncorrected point P, an ending point of the arrow indicates the corrected point P', a length of the arrow indicates the amount of correction, and a direction of the arrow indicates a correction direction. As is obvious from FIG. 6 and FIG. 7, (1) an inner area 702 (r≤d1) is reduced in an isotropic manner, (2) an outer area 703 (d1<r≤d2) is enlarged in an isotropic manner, and (3) the other area (d2<r) is not changed. The outer area 703 is enlarged inward with an outer circumference being maintained, and an inner circumference of the corrected outer area 703 coincides with an outer circumference of the corrected inner area 702. The area outside the outer area 703 is not enlarged or reduced.

Figure 7:
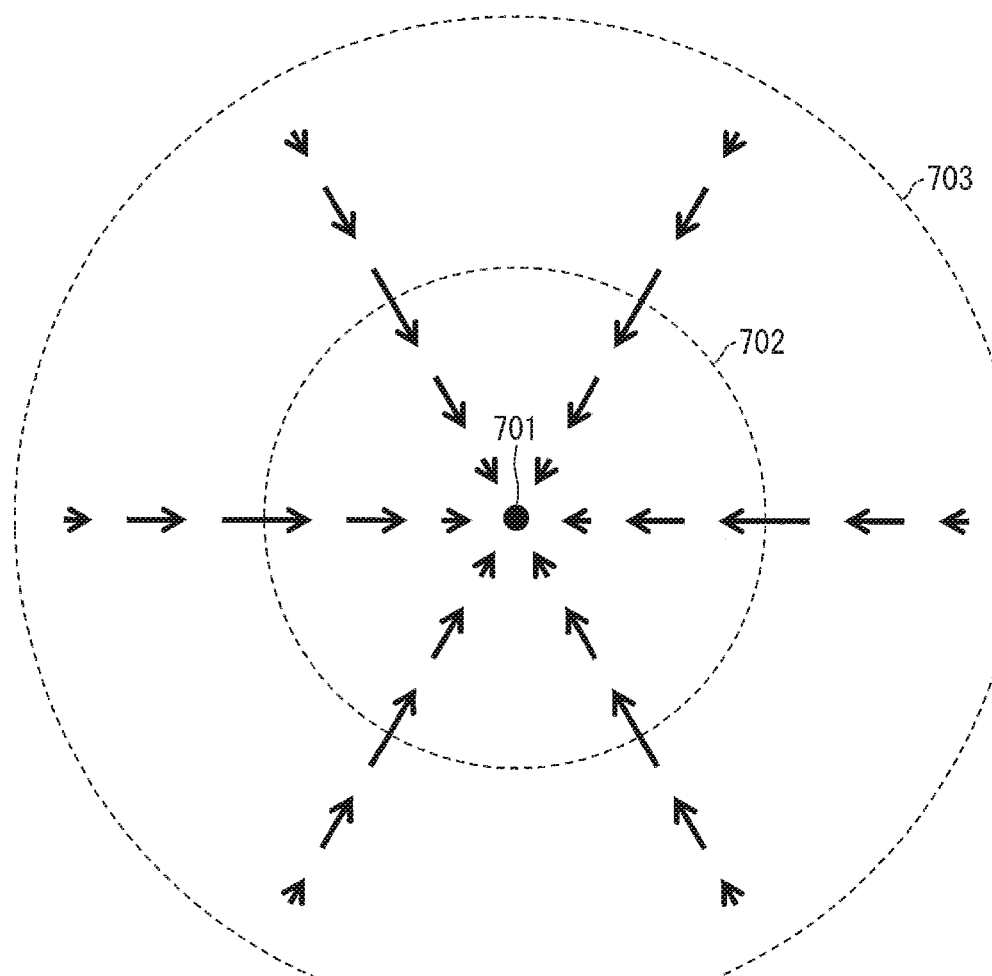
FIG. 7 is a diagram illustrating, for the image correction processing, displacement of each point due to a correction, as arrows.

A first point to note in FIG. 6 and FIG. 7 is that for the inner area 702, the amount of correction for each point P is determined according to the distance r from the correction center of the point P. Specifically, the amount of correction for each point P is correlated with the distance r from the correction center of that point P. In an aspect, the amount of correction for each point P is made proportional to the distance r from the correction center of that point P. Thus, the amount of correction in the inner area 702 decreases toward the correction center, and increases toward the outer circumference of the inner area 702. As described above, the correction center 701 is a point that approximates the center of the face, and the outer circumference of the inner area 702 is a circle approximating the facial contour. Thus, the amount of correction decreases toward the center of the face and increases toward the facial contour. As a result, the size of the face can be sufficiently reduced while suppressing effects on the face parts near the center of the face (eyes, nose, mouth, and the like). A second point to note in FIG. 6 and FIG. 7 is that the outer area 703 is enlarged inward with the outer circumference being maintained. Thus, even in a case that the face does not fit in the inner area 702 but protrudes into the outer area 703 due to individual differences in face shape, the facial contour can be moved toward the center of the face to reduce the size of the face.

Note that it is sufficient that the correction area configuration unit 42 specifies, for the inner area 702, the amount of correction for each point P according to the distance r from the correction center of the point P, and as described above, the amount of correction for each point P need not be proportional to the distance r from the correction center of the point P. For example, a correspondence relationship between the amount of correction for each point P and the distance r from the correction center of the point P may be specified by the correction area configuration unit 42 such that the graph illustrated in FIG. 6 is curved. The correction area configuration unit 42 may specify the amount of correction for each point p taking into account an angle θ of the point P with respect to the correction center. That is, anisotropic image correction processing may be performed. Details will be described in the second embodiment.

Specific Example of Correction of Enlargement/Reduction Ratio

In a case that the input image includes multiple faces and that the faces are adjacent to each other, the correction intensity configuration unit 43 corrects the enlargement/reduction ratio so as to suppress correction processing for one or both of the adjacent faces (suppression processing).

Figure 8:
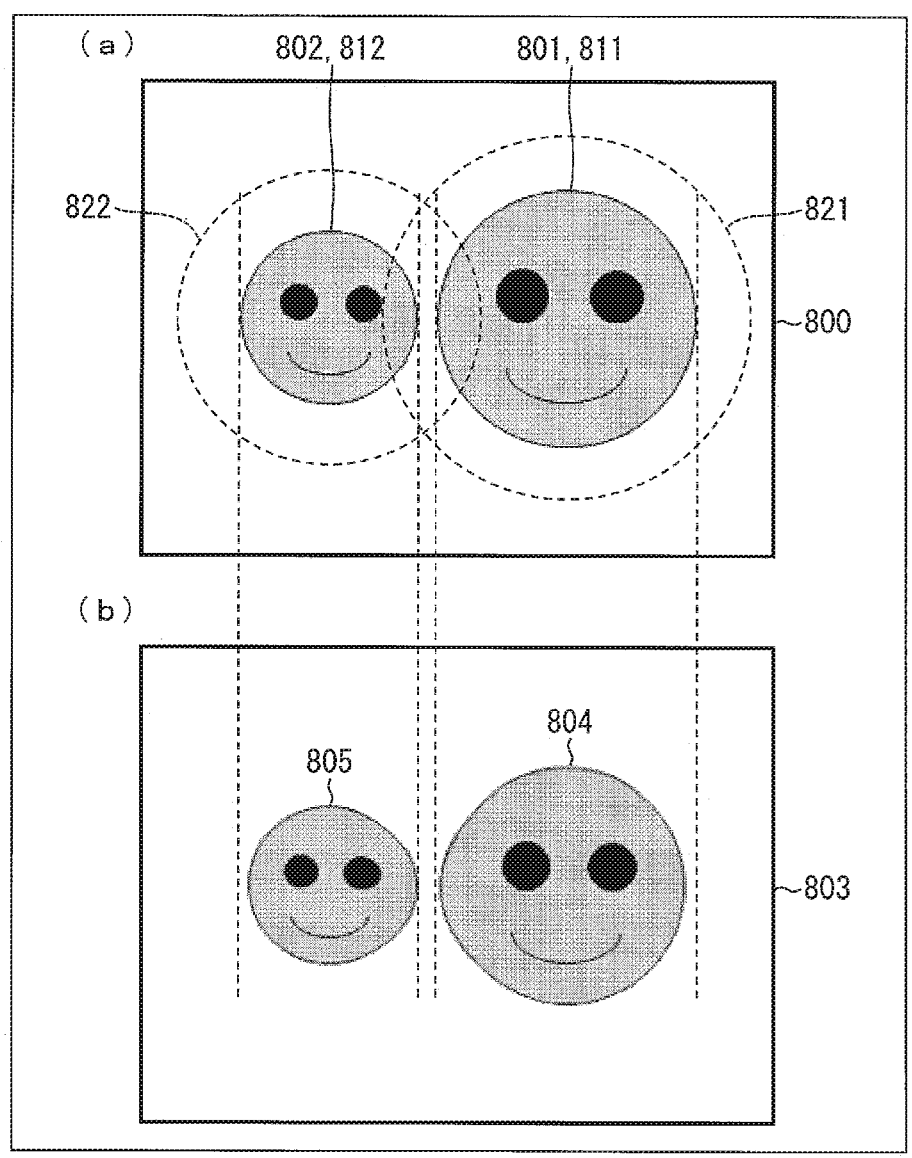
FIG. 8(a) is a diagram illustrating an input image including multiple faces as imaging objects.
FIG. 8(b) is a diagram illustrating an output image obtained by reducing both faces with no suppression processing performed.

(a) of FIG. 8 is a diagram illustrating an input image 800 including a face 801 (first target area) of a person and a face 802 (second target area) as imaging objects. (b) of FIG. 8 illustrates an output image 803 obtained by configuring, for the input image 800, a correction area for the face 801 (inner area 811 and outer area 821) and a correction area (inner area 812 and outer area 822) for the face 802, and performing a correction for making the faces smaller with the same processing intensity. Note that, for convenience of description, the inner areas 811 and 812 are illustrated as having the same ranges as those of the faces 801 and 802, which are the target areas, but it is sufficient that the inner areas be configured to include the target areas. The same applies to the following.

In (b) of FIG. 8, a face 804 of a person and a face 805 of a person in the output image 803 respectively correspond to the face 801 of the person and the face 802 of the person. A correction for reducing the face 801 of the person and the face 802 of the person is processing of reducing the image toward the processing center, and the intensity of the correction is constant regardless of the direction. However, correction of each face affects the other face in the direction in which the faces are adjacent to each other, and thus the degree of reduction is low on the left side of the face 804 of the person and on the right side of the face 805 of the person. Thus, the corrected image provides an impression that the left side of the face 804 of the person and the right side of the face 805 of the person are extended.

The present embodiment prevents this as follows. In a case that the input image 800 includes the face 801 and the face 802 and that a first correction area (inner area 811 and outer area 821) is configured for the face 801 and a second correction area (inner area 812 and outer area 822) are configured for the face 802, as illustrated in FIG. 8, the correction processing unit of the controller 40 determines whether to perform suppression processing of suppressing correction processing for at least one of the first correction area and the second correction area depending on a distance between the inner area 811 and the inner area 812.

For example, in the example of FIG. 8, the correction processing unit of the controller 40 performs the suppression processing in a case that a distance between the inner area 811 and the inner area 812 is short enough to (i) make the inner area 811 overlap the inner area 812 or the outer area 822 or to (ii) make the inner area 812 overlap the inner area 811 or the outer area 821, and otherwise omits the suppression processing.

In the suppression processing, the correction intensity configuration unit 43 corrects the enlargement/reduction ratio α for the inner area 811 and the inner area 812 and the enlargement/reduction ratio β for the outer area 821 and the outer area 822 so as to reduce the degree of reduction or enlargement (correction intensity). In other words, the correction intensity configuration unit 43 makes the enlargement/reduction ratio α and β closer to 1.

In the suppression processing, the correction intensity configuration unit 43 may reduce the correction intensity for the first correction area and the second correction area, and may make one of the correction intensities lower than the other correction intensity. The correction intensity of the correction processing may be reduced for only one of the first correction area and the second correction area.

Several processing examples will be described below.

Processing Example 1

Here, a detailed comparison between the face 804 of the person and the face 805 of the person in (b) of FIG. 8 indicates that the left eye of the face 805 of the person (right eye on the image) is significantly extended, and that the face 805 of the person is more significantly affected by the corrections of the faces. This is due to the sizes of the faces of the two persons.

Figure 9:
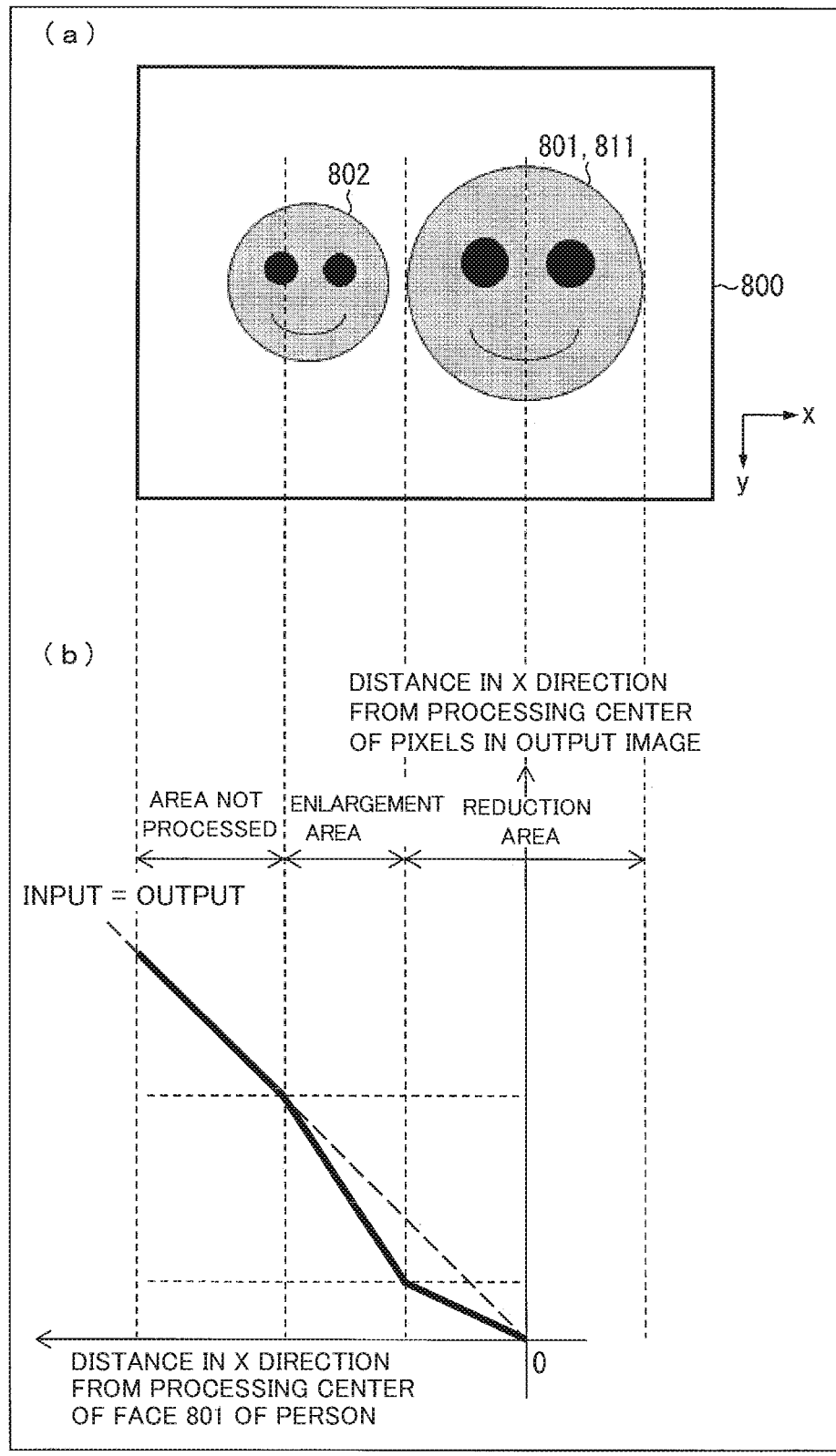
FIG. 9(a) is a diagram illustrating an input image including multiple faces as imaging objects.
FIG. 9(b) is graph illustrating, for image correction processing for a larger face in FIG. 9(a), a relationship between a distance in an x direction from a correction center of an uncorrected point and a distance in the x direction from a correction center of a corrected point.

(a) of FIG. 9 is a diagram illustrating the input image 800 including the face 801 and the face 802, as in (a) of FIG. 8. (b) of FIG. 9 is a graph illustrating, for the image correction processing for the larger face 801 in (a) of FIG. 9, a relationship between a distance from the correction center of the uncorrected point in an x direction and a distance from the correction center of the corrected point in the x direction. As illustrated in FIG. 9, in the correction area, pixels move in a direction approaching the correction center, and the amount of movement is largest at the boundary between the inner area (reduction area, 811) and the outer area (enlargement area, not illustrated). A part of the outer area (enlargement area) overlaps the face 802 of the person, and this indicates that the face 802 of the person moves rightward under the effect of correction of the face 801 of the person.

Figure 10:
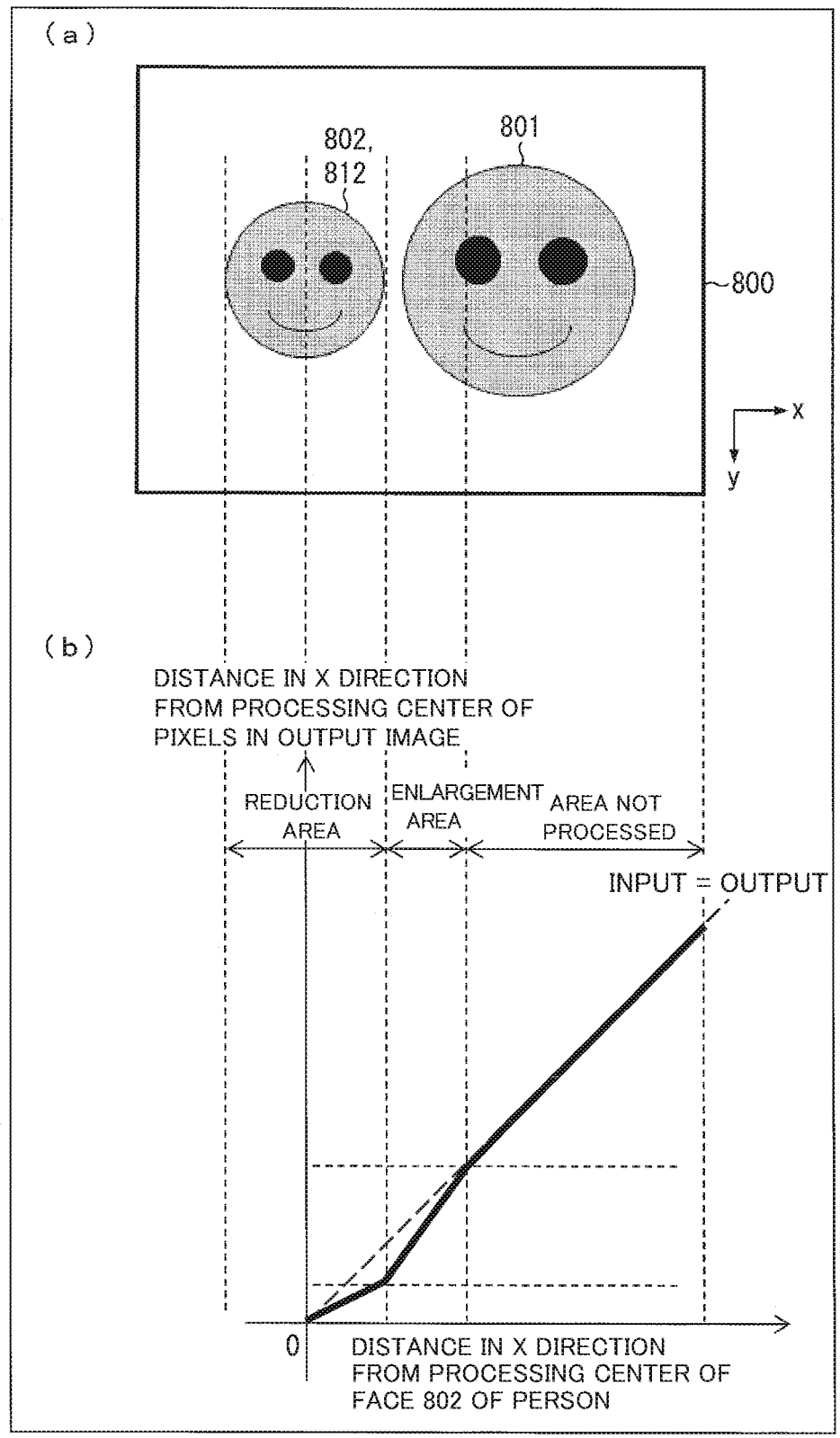
FIG. 10(a) is a diagram illustrating an input image including multiple faces as imaging objects.
FIG. 10(b) is a graph illustrating, for image correction processing for a smaller face in FIG. 10(a), a relationship between a distance in the x direction from a correction center of an uncorrected point and a distance in the x-direction from a correction center of a corrected point.

(a) of FIG. 10 is a diagram illustrating the input image 800 including the face 801 and the face 802, as in (a) of FIG. 8. (b) of FIG. 10 is a graph illustrating, for the image correction processing for the smaller face 802 in (a) of FIG. 10, a relationship between a distance from the correction center of the uncorrected point in the x direction and a distance from the correction center of the corrected point in the x direction. As illustrated in FIG. 10, in the correction area, pixels move in a direction approaching the correction center, and the amount of movement is largest at the boundary between the inner area (reduction area, 812) and the outer area (enlargement area, not illustrated). A part of the outer area (enlargement area) overlaps the face 801 of the person, and this indicates that the face 801 of the person moves leftward under the effect of correction of the face 802 of the person.

A comparison between FIG. 9 and FIG. 10 indicates that, since the face 801 of the person and the face 802 of the person are different from each other in size and the correction areas are also different from each other in size, the amount of movement of pixels varies between the face 801 of the person and the face 802 of the person despite correction with the same correction intensity. The amount of movement of the pixels due to the correction of the face 801 of the person is larger. Thus, the effect, on the second correction area corresponding to the face 802 of the person, of the correction processing for the first correction area corresponding to the face 801 of the person is higher than the effect, on the first correction area corresponding to the face 801 of the person, of the correction processing for the second correction area corresponding to the face 802 of the person. As in the output image 803 illustrated in (b) of FIG. 8, the smaller face 802 of the person is more significantly distorted.

Thus, in the present embodiment, the correction processing unit of the controller 40 suppresses the image correction processing (correction processing) for the larger of the first correction area corresponding to the face 801 and the second correction area corresponding to the larger face 802, that is, the first correction area in the suppression processing. Thus, both the face 801 and the face 802 are corrected to be smaller, allowing an image with reduced distortion to be generated.

Figure 11:
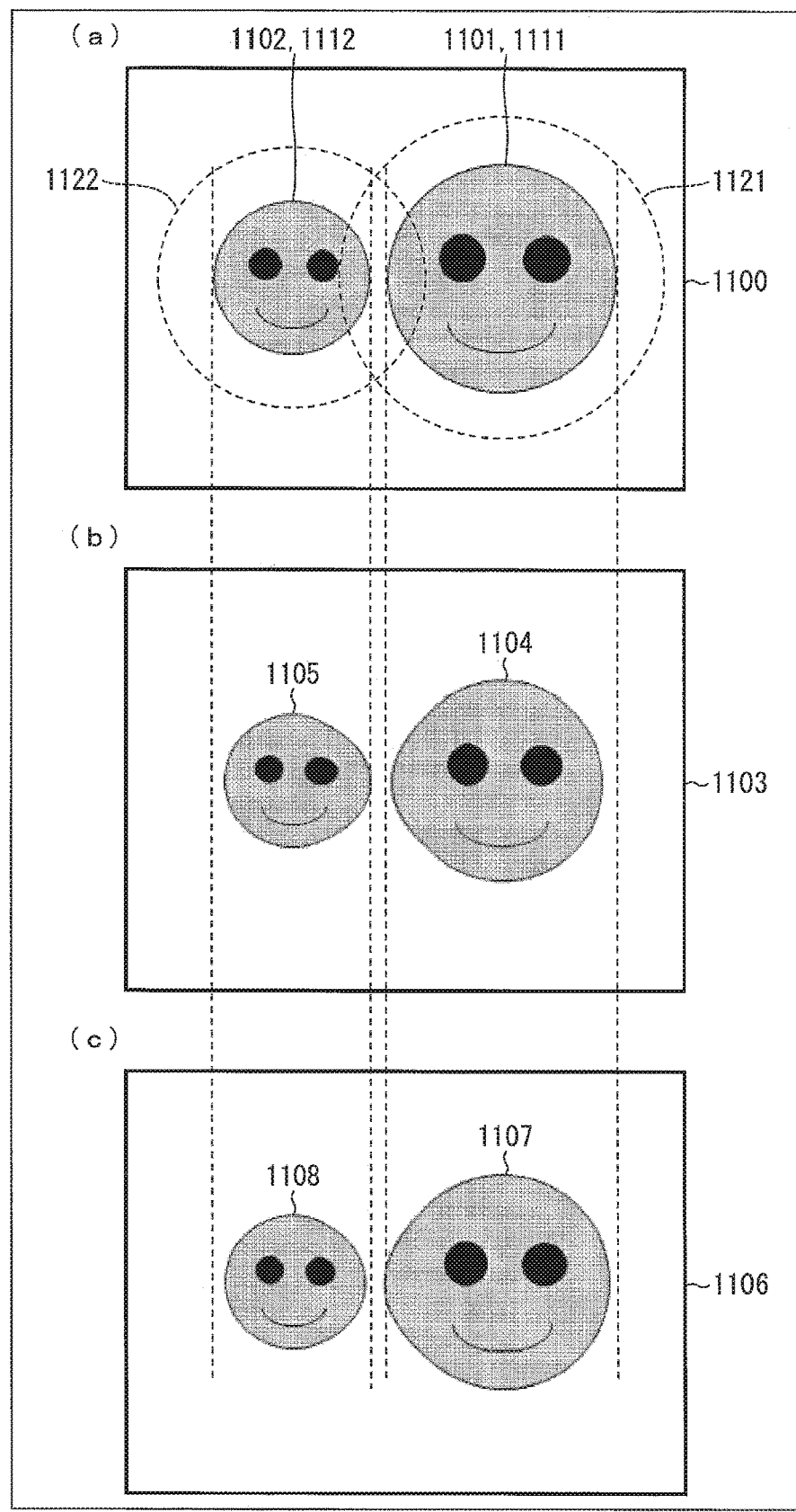
FIG. 11(a) is a diagram illustrating an input image including multiple faces as imaging objects.
FIG. 11(b) is a diagram illustrating an output image obtained by reducing both faces with no suppression processing performed.
FIG. 11(c) is a diagram illustrating an output image obtained by performing image correction processing involving suppression processing.

(a) of FIG. 11 is a diagram illustrating an input image 1100 including a face 1101 of a person and a face 1102 of a person as imaging objects. As illustrated in (a) of FIG. 11, the face 1101 of the person is larger than the face 1102 of the person, and the first correction area (inner area 1111 and outer area 1121) corresponding to the face 1101 is larger than the second correction area (inner area 1112 and outer area 1122) corresponding to the face 1102.

Here, (b) of FIG. 11 is a diagram illustrating, for the input image 1100, an output image 1103 in which the first correction area and the second correction area are corrected with the same correction intensity so as to be smaller, with no suppression processing performed. In (b) of FIG. 11, a face 1104 of a person and a face 1105 of a person in the output image 1103 respectively correspond to the face 1101 of the person and the face 1102 of the person in the input image 1100. In the output image 1103, the left side of the face 1104 of the person and the right side of the face 1105 of the person are extended under the effect of the correction processing on the correction areas corresponding to the respective faces, and in particular, the right side of the face 1105 of the person is significantly extended.

In contrast, (c) of FIG. 11 is a diagram illustrating an output image 1106 obtained by performing, on the input image 1100, image correction processing involving suppression processing and configuring the correction intensity for the image correction processing for the first correction area (inner area 1111 and outer area 1121) corresponding to the face 1101 equal to half of the correction intensity for the image correction processing for the second correction area (inner area 1112 and outer area 1122) corresponding to the face 1102. A face 1107 of a person and a face 1108 of a person in an output image 1106 respectively correspond to the face 1101 of the person and the face 1102 of the person in the input image 1100. In the output image 1106, each of the faces is affected by the correction of the other face. However, compared to the output image 1103, the preferable output image 1106 with reduced extension of the right side of the face 1105 of the person is generated.

Processing Example 2

Note that, as illustrated in (c) of FIG. 11, distortion is reduced by performing the suppression processing to adjust the correction intensity based on the size of the face but that the left side of the face 1107 of the person and the right side of the face 1108 of the person are extended. Thus, in an embodiment, in the suppression processing, the correction processing unit of the controller 40 may suppress image correction processing for both adjacent faces and also more significantly suppress image correction processing for the larger face.

Figure 12:
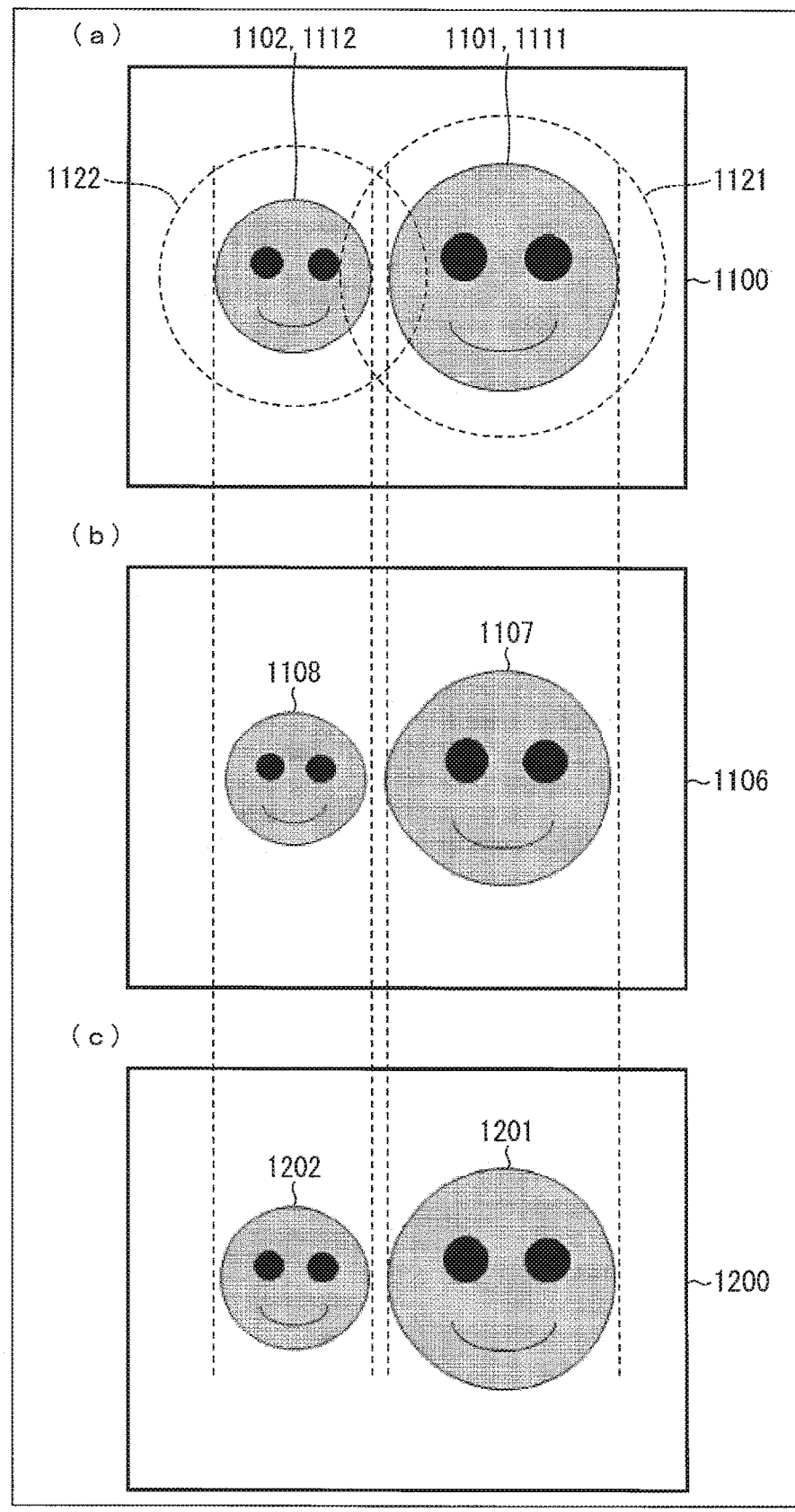
FIG. 12(a) is a diagram illustrating an input image including multiple faces as imaging objects.
FIG. 12(b) is a diagram illustrating an output image obtained by performing image correction processing involving suppression processing.
FIG. 12(c) is a diagram illustrating an output image obtained by performing image correction processing involving further suppression processing.

Like (a) of FIG. 11, (a) of FIG. 12 is a diagram illustrating the input image 1100 including the face 1101 of the person and the face 1102 of the person as imaging objects. Like (c) of FIG. 11, (b) of FIG. 12 is a diagram illustrating an output image 1106 obtained by performing, on the input image 1100, image correction processing involving suppression processing and configuring the correction intensity for the image correction processing for the first correction area (inner area 1111 and outer area 1121) corresponding to the face 1101 equal to half of the correction intensity for the image correction processing for the second correction area (inner area 1112 and outer area 1122) corresponding to the face 1102. (c) of FIG. 12 is a diagram illustrating an output image 1200 obtained by performing, on the input image 1100, image correction processing involving suppression processing, halving the correction intensity for the image correction processing for the first correction area (inner area 1111 and outer area 1121) corresponding to the face 1101 and the correction intensity for the image correction processing for the second correction area (inner area 1112 and outer area 1122) corresponding to the face 1102, and further halving the correction intensity for the image correction processing for the first correction area (inner area 1111 and outer area 1121) corresponding to the face 1101.

A comparison between the output image 1106 and the output image 1200 indicates that the distortion of the face of the person is reduced and that a preferable corrected image has been generated. Note that, in FIG. 11, the face 1107 is distorted in the output image 1106 that has been subjected to the image correction processing involving the suppression processing. This is because an image configured with a high correction intensity is illustrated in order to describe the effect of Processing Example 2. An appropriately configured correction intensity allows generation of a preferable corrected image with reduced distortion even in a case that the suppression processing in Processing Example 1 is performed.

Modified Examples

An increase in the difference in size between the correction areas (inner area and outer area) corresponding to the adjacent faces increases the difference between the adjacent faces in the effect of the image correction processing for each face on the adjacent face. Thus, the correction processing unit of the controller 40 may adjust the correction intensity of the image correction processing for each of the adjacent faces in accordance with the difference in size between the correction areas (inner area and outer area) corresponding to the adjacent face. Thus, the correction intensity can be preferably adjusted in accordance with the difference in size between the correction areas (inner area and outer area) corresponding to the adjacent faces.

In a case that the difference in size between the correction areas (inner area and outer area) corresponding to the adjacent faces is less than a constant value, the difference between the adjacent faces in the effect of the image correction processing for each face on the adjacent face also decreases, and thus adjustment of the correction intensity based on the size of the face as described in Processing Examples 1 and 2 may be omitted. In a case that the difference in size between the correction areas (the inner area and the outer area) corresponding to the adjacent faces is equal to or more than the constant value, adjustment of the correction intensity based on the size of the face as described in Processing Examples 1 and 2 may be performed.

A decrease in the distance between the adjacent faces increases the magnitude of the effect of the image correction processing for the correction area corresponding to one face on the correction area corresponding to the other face. Thus, the correction intensity may be adjusted by further taking into account the distance between adjacent faces or the distance between the inner areas of the correction areas corresponding to the adjacent faces. By increasing the amount of adjustment (amount of reduction) of the correction intensity with decreasing distance between the adjacent faces or the distance between the adjacent inner areas, a preferable corrected image with reduced distortion can be generated.

As described above, in the present embodiment, in a case that correction areas corresponding to multiple target areas (faces) to be corrected are adjacent to each other, the correction intensity of the correction processing for the correction area (inner area and outer area) corresponding to each of the target areas is configured, based on the size of the target area. Then, the effect of correction for one of the correction areas on the other correction area can be appropriately reduced, and a preferable image with reduced unnatural distortion can be generated.

Supplemental Note

Figure 21:
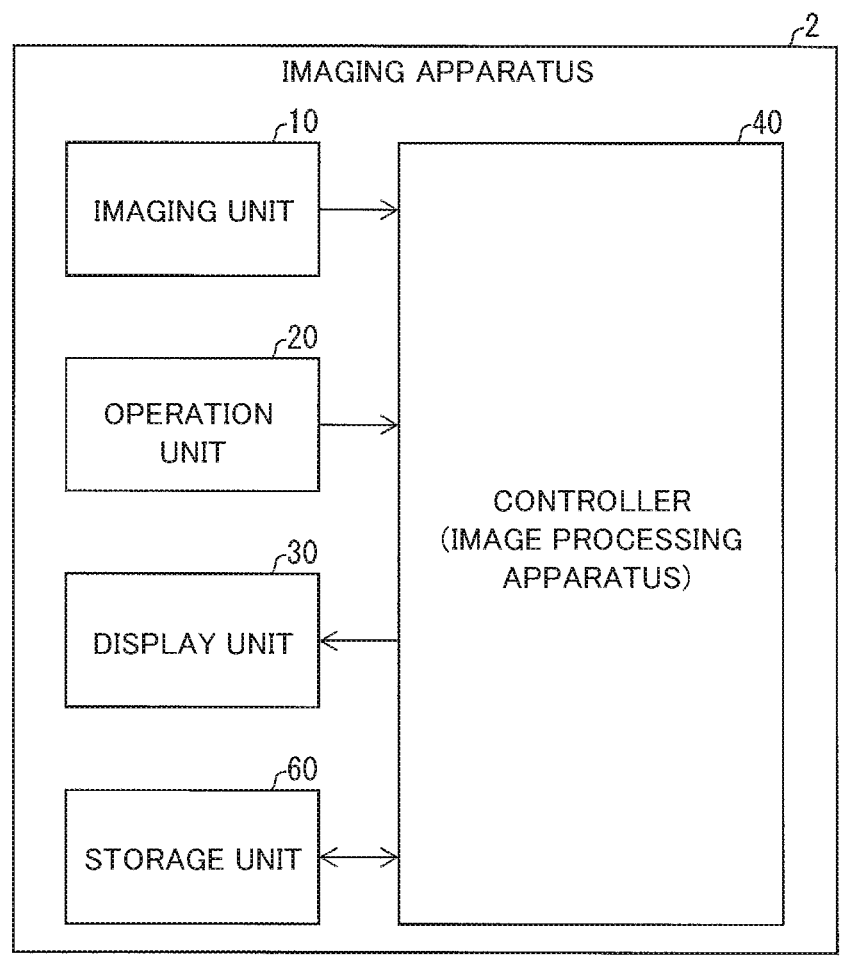
FIG. 21 is a block diagram illustrating a configuration of an imaging apparatus according to an embodiment of the present disclosure.

Another aspect of the present embodiment may be an image capturing apparatus including no printing function. FIG. 21 is a functional block diagram illustrating a configuration of an imaging apparatus 2 according to another aspect of the present embodiment. The imaging apparatus 2 includes the imaging unit 10, the operation unit 20, the display unit 30, the controller 40 (image processing apparatus), and the storage unit 60 similarly to the image printing apparatus 1, but does not include the printing unit 50.

As described above, in the present embodiment, the shape of the inner area of the correction area is not limited to a circle. That is, it is sufficient that the inner area is an area with a prescribed shape having a position corresponding to the center of the face and having a size corresponding to the size of the face. The prescribed shape may be an ellipse, a polygon, or the like, instead of a circle. The shape of the outer area of the correction area is also not limited to a circle, and may be an ellipse, a polygon, or the like.

In the present embodiment, the input image may include three or more imaging objects. In that case, the above-described processing may be performed for each of combinations of two imaging objects for the three or more imaging objects.

Second Embodiment

Now, a second embodiment of the present invention will be described below, based on FIGS. 13 to 18. Note that, for the sake of convenience of description, members having the same functions as those of the members described in the above embodiment are denoted by the same reference signs, and descriptions of the members are omitted. In the second embodiment, a method for adjusting the correction intensity based on a positional relationship between multiple adjacent correction areas will be described.

In the present embodiment, in the suppression processing, the correction processing unit of the controller 40 changes the degree of suppression in accordance with the positional relationship between the faces included in the input image. Several examples will be described below.

Processing Example 3

Figure 13:
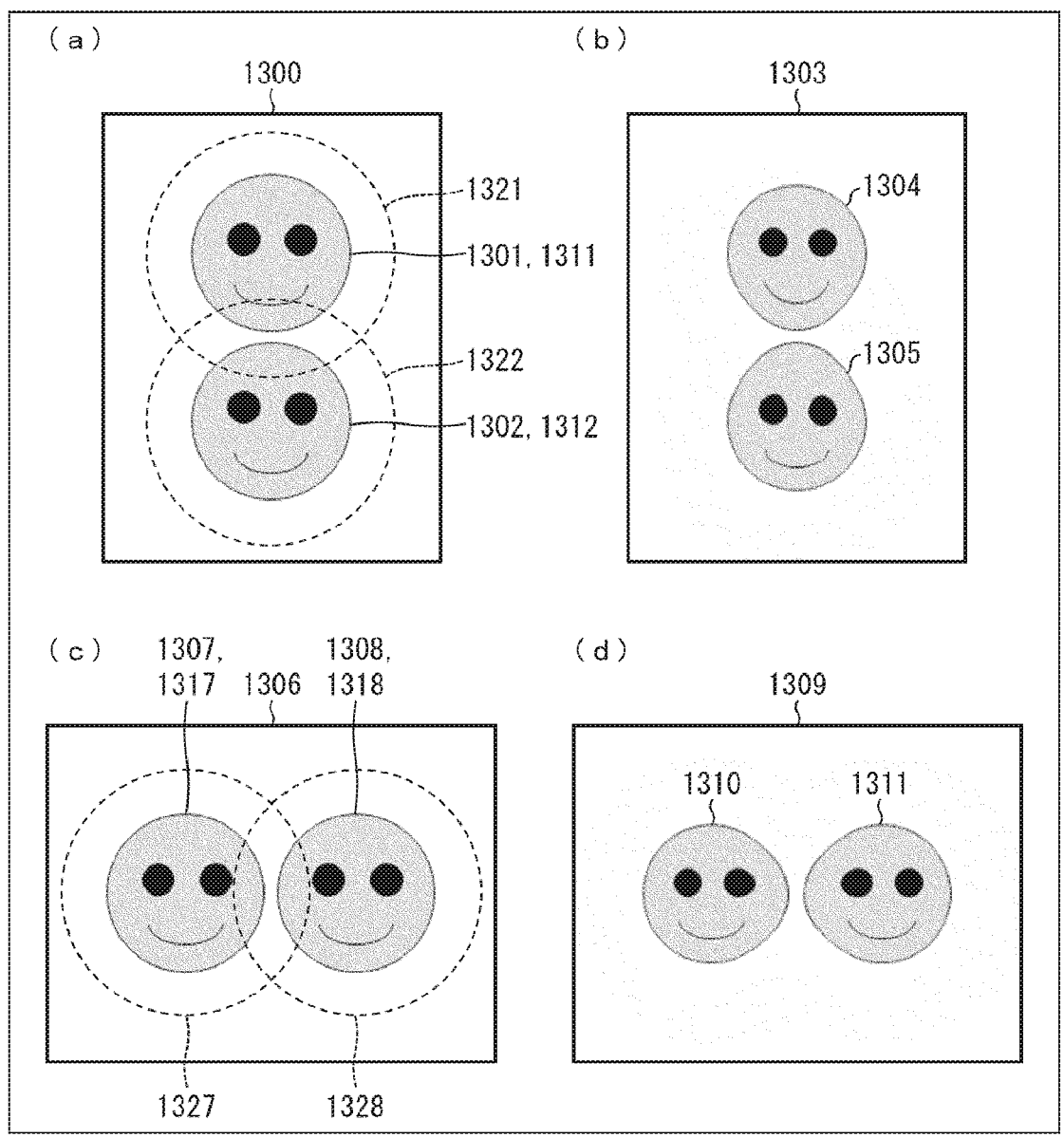
FIG. 13(a) is a diagram illustrating an input image in which multiple faces are arranged in tandem in a vertical direction.
FIG. 13(b) is a diagram illustrating an output image obtained by correcting the input image illustrated in FIG. 13(a) so as to make the faces of persons smaller with no suppression processing performed.
FIG. 13(c) is a diagram illustrating an input image in which multiple faces are arranged in juxtaposition in a lateral direction.
FIG. 13(d) is a diagram illustrating an output image obtained by correcting the input image illustrated in FIG. 13(c) so as to make the faces of the persons smaller with no suppression processing performed.

(a) of FIG. 13 is a diagram illustrating an input image 1300 in which a face 1301 (first target area) of a person and a face 1302 (first target area) of a person are arranged in tandem in the vertical direction (up-downward direction). As illustrated in (a) of FIG. 13, a first correction area (inner area 1311 and outer area 1321) corresponding to the face 1301, and a second correction area (inner area 1312 and outer area 1322) corresponding to the face 1302 are arranged in tandem in the vertical direction (up-downward direction). (b) of FIG. 13 illustrates an output image 1303 obtained by correcting the first correction area and the second correction area so as to make the faces of the person smaller with no suppression processing performed. A face 1304 of a person and a face 1305 of a person in an output image 1303 respectively correspond to the face 1301 of the person and the face 1302 of the person of the input image 1300.

(c) of FIG. 13 is a diagram illustrating an input image 1306 in which a face 1307 (first target area) of a person and a face 1308 (second target area) of a person are arranged in juxtaposition in the lateral direction (left and right direction). As illustrated in (c) of FIG. 13, a first correction area (inner area 1317 and outer area 1327) corresponding to the face 1307 and a second correction area (inner area 1318 and outer area 1328) corresponding to the face 1308 are arranged in juxtaposition in the lateral direction (left and right direction). (d) of FIG. 13 is a diagram illustrating an output image 1309 obtained by correcting the first correction area and the second correction area so as to make the faces of the person smaller with no suppression processing performed. A face 1310 of a person and a face 1311 of a person in an output image 1309 correspond to the face 1307 of the person and the face 1308 of the person of the input image 1306.

Here, it is assumed that the face 1301, 1302, 1307, and 1308 of the person are all the same in size and that the distance between the face 1301 of the person and the face 1302 of the person is the same as the distance between the face 1307 of the person and the face 1308 of the person. It is also assumed that, in a case that no suppression processing is performed, the correction intensities for the input images 1300 and 1306 are the same.

A comparison among the corrected faces 1304, 1305, 1310, and 1311 in the output image 1303 and the output image 1309 indicates that a side of each face adjacent to the other face is distorted under the effect of the image correction processing on the other face. Specifically, the following sides are extended: a lower side of the face 1304 of the person, an upper side of the face 1305 of the person, a right side of the face 1310 of the person, and a left side of the face 1311 of the person. In particular, for the face 1310 of the person and the face 1311 of the person, the left-right symmetry of the face is lost, and thus, a very unnatural impression due to distortion is provided. Although the face 1305 of the person is prevented from losing left-right symmetry, the upper portion of the face is extended, and the lower portion of the face is corrected to be thicker. Thus, an impression of a small face is insignificant. On the other hand, the face 1304 of the person is prevented from losing left-right symmetry, and in spite of an extended lower part of the face, the jaw line is sharp, providing an impression of a small face.

As described above, in a case that the image correction processing is performed, with the same correction intensity, on the correction areas corresponding to the multiple adjacent faces (target areas), the effect of the image correction processing for the correction area corresponding to each face (target area) on the correction areas corresponding to the other target area differs depending on the positional relationship between the correction areas corresponding to the faces (target areas).

For example, in a case that the adjacent faces (target areas) are arranged in juxtaposition in the lateral direction and the correction areas corresponding to the respective adjacent faces are arranged in juxtaposition in the lateral direction, the corrected image loses left-right symmetry as illustrated in (d) of FIG. 13, thus providing more unnatural impression than in a case that the faces are arranged in tandem in the vertical direction ((b) of FIG. 13).

Thus, in the suppression processing, in a case that the adjacent correction areas are arranged in juxtaposition in the lateral direction, the correction processing unit of the controller 40 makes the degree of suppression higher (the correction intensity configuration unit 43 makes the enlargement/reduction ratios α and β closer to 1) than in a case that the correction areas are arranged in tandem in the vertical direction. In a case that the correction areas are adjacent to each other in the lateral direction as illustrated in (c) of FIG. 13, the effect of the image correction processing for each face on the other face is equal (left-right inversion), and thus the correction processing unit of the controller 40 preferably performs the suppression processing so as to perform the image correction processing on each face with the same correction intensity.

For example, in a case that the adjacent correction areas are arranged in tandem in the vertical direction, as illustrated in (a) of FIG. 13, in the corrected image, the lower face provides a more unnatural impression than the upper face, as illustrated in (b) of FIG. 13.

Thus, in the suppression processing, in a case that the adjacent correction areas are arranged in tandem in the vertical direction, the correction processing unit of the controller 40 configures the degree of suppression in the image correction processing higher for the correction area positioned on the upper side than the image correction processing for the correction area positioned on the lower side (the correction intensity configuration unit 43 makes the enlargement/reduction ratios α and β closer to 1).

Figure 14:
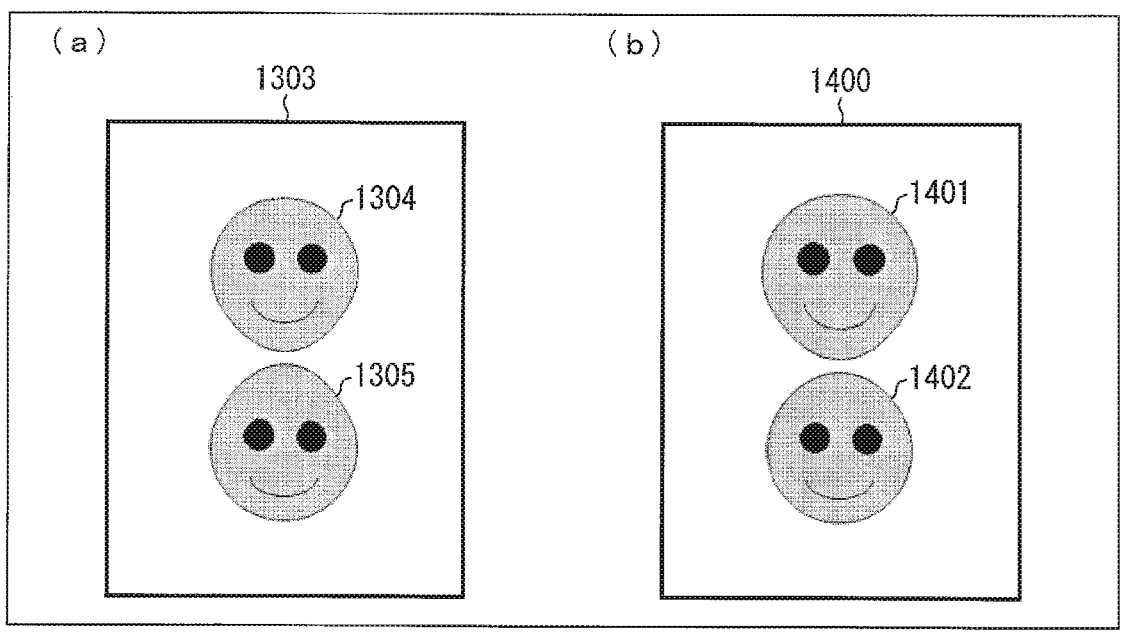
FIG. 14(a) is a diagram illustrating an input image in which multiple faces are arranged in tandem in a vertical direction.
FIG. 14(b) is a diagram illustrating an output image obtained by correcting the input image illustrated in FIG. 14(a) face so as to adjustably reduce a correction intensity for image correction processing for a face located on an upper side.

Like (b) of FIG. 13, (a) of FIG. 14 is a diagram illustrating an output image 1303 obtained by correcting, on an input image 1300 in which a face 1301 and a face 1302 are arranged in tandem in the vertical direction, a correction area corresponding to the face 1301 and a correction area corresponding to the face 1302 so as to make the faces smaller with no suppression processing performed. (b) of FIG. 14 is a diagram illustrating an output image 1400 obtained by correcting an input image 1300 by adjustably reducing the correction intensity of the image correction processing for the correction area corresponding to the face 1301 of the person positioned on the upper side. Faces 1401 and 1402 of persons respectively correspond to the faces 1301 and 1302 of the persons.

A comparison between the output image 1303 and the output image 1400 indicates that, in the output image 1400, the extension of the upper part of the face 1402 of the lower person is made smaller than the extension of the upper part of the face 1305 of the person, providing an impression of a small face, and the face 1401 of the upper person is corrected to have a thin jaw line, providing an impression of a small face. Both the faces of the two persons are preferably corrected.

Processing Example 4

By adjusting the correction intensity based on the inclination of the face, preferable correction can be performed. The image correction processing described in FIGS. 6 and 7 employs a configuration in which the inner area and the outer area are reduced or enlarged in an isotropic manner by using the direction-independent enlargement/reduction ratios α and β. In contrast, for example, direction-dependent enlargement/reduction ratios α (θ) and β (θ) may be used to reduce the inner area and the outer area in an anisotropic manner. Here, θ represents a direction viewed from the correction center, where θ=0 in the right direction of the input image, θ=π/2 in the upward direction of the input image, θ=π in the left direction of the input image, and θ=3π/2 in the downward direction of the input image (in units of radians). For example, a preferable correction can be made by estimating the orientation of the face from the positions of the left and right eyes and performing anisotropic processing based on the face orientation.

Figure 15:
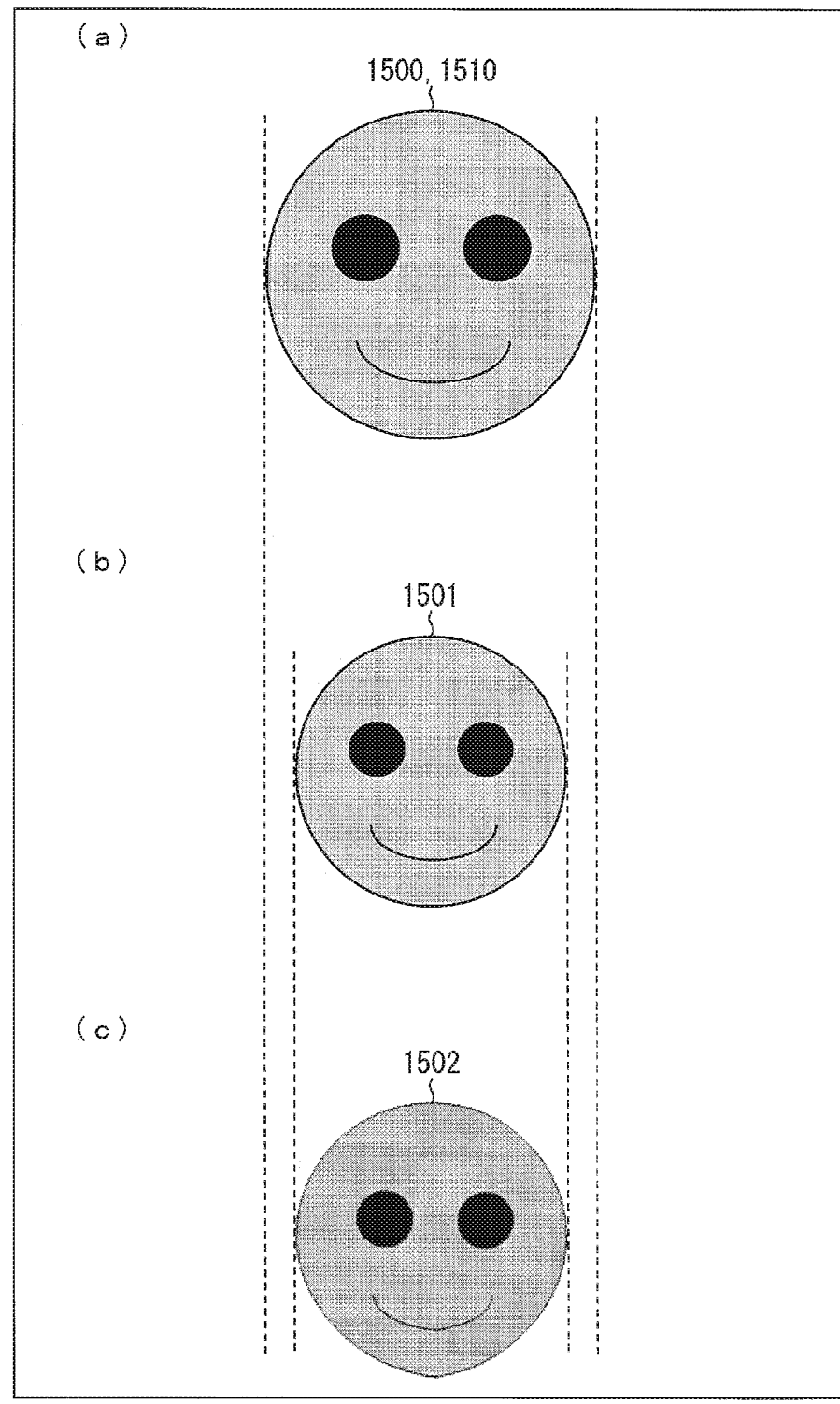
FIG. 15(a) is a diagram illustrating a face.
FIG. 15(b) is a diagram illustrating a face resulting from an isotropic correction performed on the face illustrated in FIG. 15(a)
FIG. 15(c) is a diagram illustrating a face resulting from an anisotropic correction performed on the face illustrated in FIG. 15(a).

(a) of FIG. 15 is a diagram illustrating a face 1500 of a person, and correction areas (inner area 1510. The outer area is not illustrated) are configured. (b) of FIG. 15 is a diagram illustrating a face 1501 of a person with an inner area 1510 corrected in an isotropic manner. (c) of FIG. 15 is a diagram illustrating a face 1502 with the inner area 1510 corrected in an anisotropic manner. The face 1501 of the person is a face resulting from a correction of the inner area 1510 corresponding to the face 1500 of the person with a constant correction intensity regardless of an angle with respect to the correction center. For the face 1502 of the person, the correction intensity for the inner area 1510 varies depending on the angle with respect to the correction center. The correction intensity is low in the upward direction of the face, is medium in the left and right direction and downward direction of the face, and is highest in an obliquely downward direction of the face. A comparison between the face 1501 of the person and the face 1502 of the person indicates that the faces 1501 and 1502 have an equal width but that the face 1502 of the person has a sharp jaw line, with the corrected image providing an impression of a much smaller face. In a case that a correction is performed to reduce the face as illustrated in FIG. 15, compared to performing a correction with a constant correction intensity regardless of the direction, changing the correction intensity depending on the direction with respect to the correction center enables a change in impression even with an equivalent correction intensity. The orientation of the face can be calculated, for example, based on the detected positions of the left and right eyes.

Figure 16:
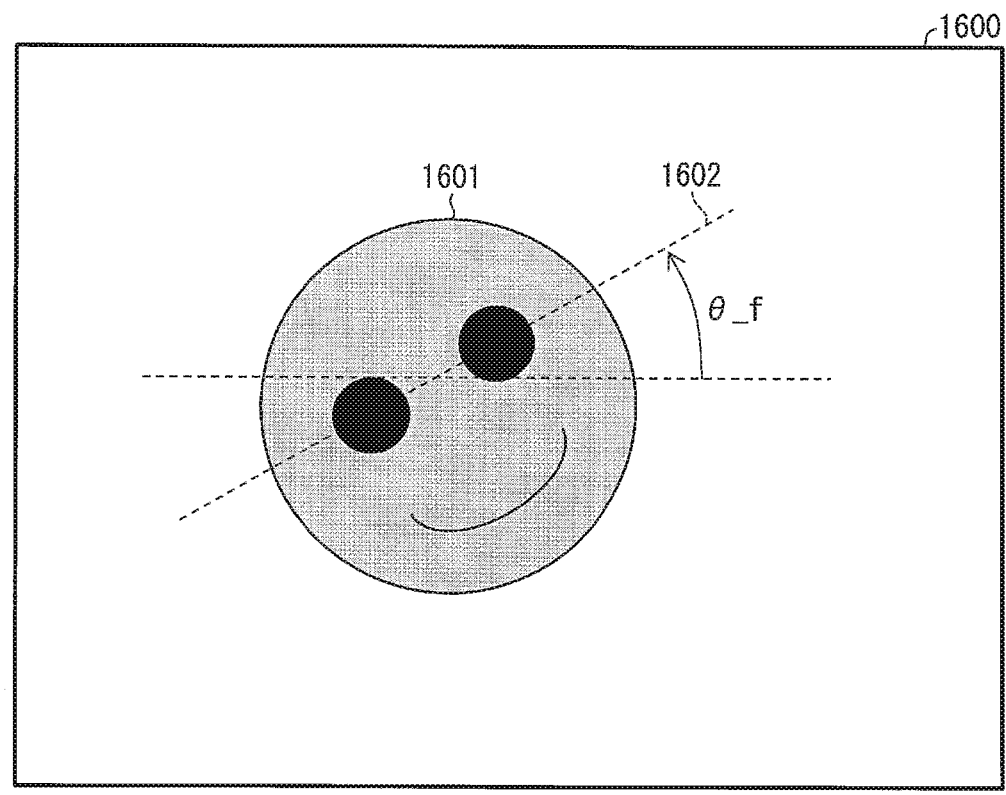
FIG. 16 is a diagram illustrating an input image including an inclined face of a person face as an imaging object.

FIG. 16 is a diagram illustrating an input image 1600 including an inclined face 1601 of a person as an imaging object. An inclination $\theta\_f$ of the face is defined as an angle formed between an x-axis (horizontal axis) of the input image 1600 and a straight line 1602 connecting the left and right eyes. Assuming that the position of the left eye is (LEFT_x, LEFT_y) and the position of the right eye is (RIGHT_x, RIGHT_y), the inclination $\theta\_f$ of the face can be calculated in accordance with Equation (6) below.

$$\theta\_f = \arctan((RIGHT\_y - LEFT\_y)/RIGHT\_x - LEFT\_x) \quad (6)$$

Now, a method for configuring the enlargement/reduction ratios $\alpha(\theta)$ and $\beta(\theta)$ according to the direction viewed from the correction center will be described.

The use of the inclination $\theta\_f$ of the face allows the direction $\theta$ viewed from the correction center (assuming that the right direction of the image is $\theta=0$, the upward direction of the image is $\theta=\pi/2$, the left direction of the image is $\theta=\pi$, and the downward direction of the image is $\theta=3\pi/2$) to be associated with the direction of the face. Specifically, the direction $\theta=\theta\_f$ is the right direction of the face, the direction $\theta=\theta\_f+\pi/2$ is the upward direction of the face, the direction $\theta=\theta\_f+\pi$ is the left direction of the face, and the direction $\theta=\theta\_f+3\pi/2$ is the lower direction of the face (in units of radians).

The enlargement/reduction ratio $\alpha(\theta)$ relative to the inner area can be, for example, though not limited to, (1) $\alpha(\theta)=0.95$ in a case of $\theta=\theta\_f$ (right direction of the face), (2) $\alpha(\theta)=1$ in a case of $\theta=\theta\_f+\pi/2$ (upward direction of the face), (3) $\alpha(\theta)=0.95$ in a case of $\theta=\theta\_f+\pi$ (left direction of the face), and (4) $\alpha(\theta)=0.95$ in a case of $\theta=\theta\_f+3\pi/2$. The enlargement/reduction ratio $\alpha(\theta)$ relative to the inner area can be $\alpha(\theta)=0.9$ in a case of $\theta=\theta\_f+5\pi/4$ (lower left of the face) and $\theta=\theta\_f+7\pi/4$ (lower right of the face). Thus, the amount of correction in the upward direction of the face is the smallest, the amount of correction in the lateral direction and downward direction of the face is medium, and the amount of correction in an obliquely downward direction of the face is the largest. The enlargement/reduction ratio $\beta(\theta)$ for the outer area may be configured in accordance with $\beta(\theta)=(d2-\alpha(\theta)d1)/(d2-d1)$. Thus, the area outside the outer area is not enlarged or reduced.

The correction processing by the image correction unit 44 is implemented by, similarly to the first embodiment, transferring a point P=(r cos $\theta$, r sin $\theta$)+(c1, c2), where r represents a distance from the correction center and $\theta$ represents a direction viewed from the correction center= (c1, c2), to (1) a point P'=(r' cos $\theta$, r' sin $\theta$)+(c1, c2) in a case of r≤d1, where the distance from the correction center is r'=$\alpha(\theta)$r and the direction viewed from the correction center is $\theta$, and to (2) a point P'=(r' cos $\theta$, r' sin $\theta$)+(c1, c2) in a case of d1<r≤d2, where the distance from the correction center is r'=$\beta(\theta)$r−($\beta(\theta)$−$\alpha(\theta)$)d1 and the direction viewed from the correction center is $\theta$. In a case that the enlargement/reduction ratios $\alpha(\theta)$ and $\beta(\theta)$ for respective directions are configured as described above, the corrected face 1502 has a sharper line from the cheeks to jaw than the uncorrected face 1500, as illustrated in (c) of FIG. 15.

Thus, in the present processing example, the correction processing unit of the controller 40 performs the image correction processing such that the degree of reduction or enlargement from the center of the inner area corresponding to the face (target area) toward a specific direction is higher than the degree of reduction or enlargement from the center of the inner area corresponding to the face (target area) toward another direction.

Figure 17:
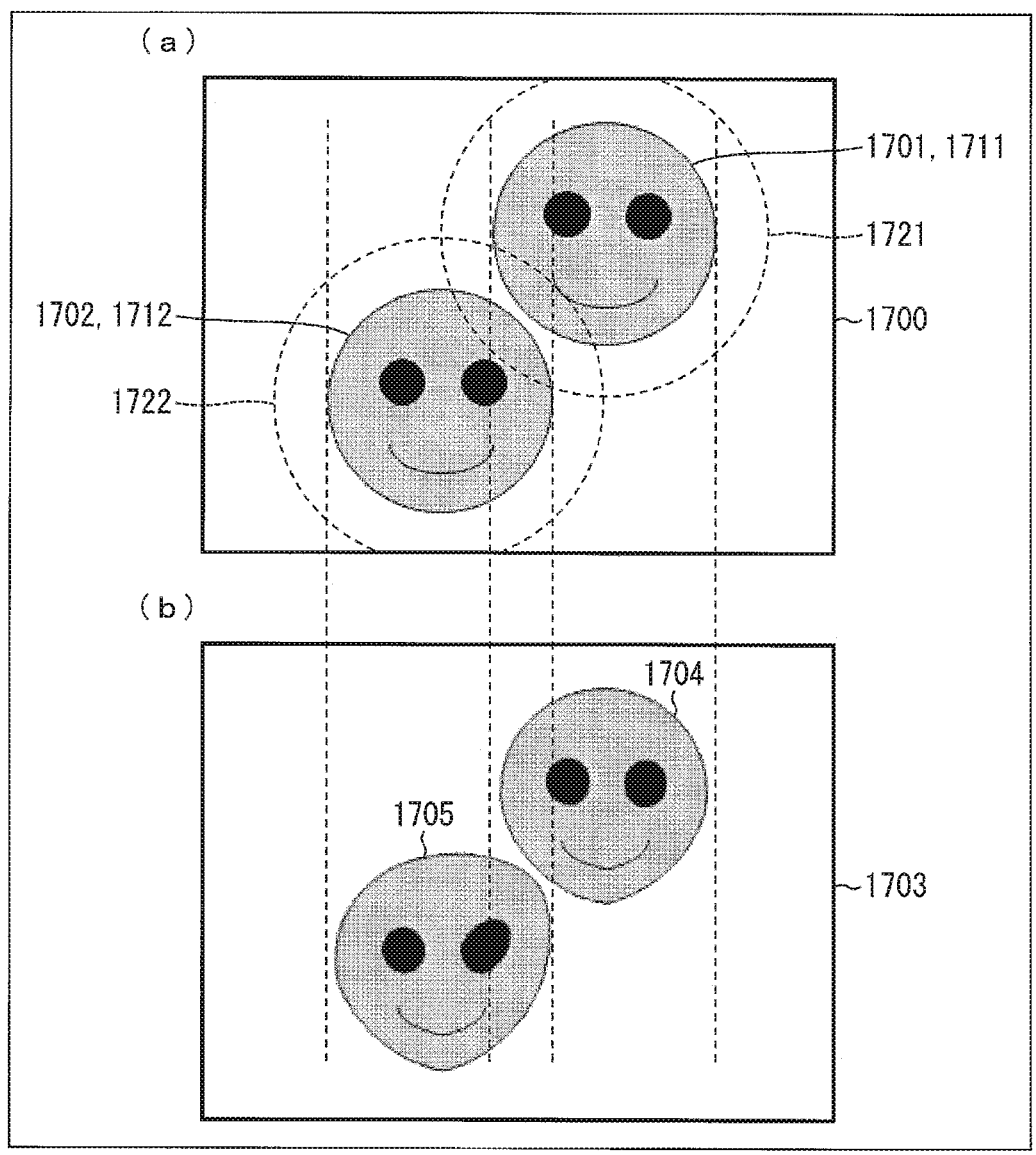
FIG. 17(a) is a diagram illustrating an input image in which multiple faces are obliquely disposed.
FIG. 17(b) is a diagram illustrating an output image obtained by correcting the input image illustrated in FIG. 17(a) so as to make the faces of the persons smaller with no suppression processing performed.

(a) of FIG. 17 is a diagram illustrating an input image 1700 in which a face 1701 of a person and a face 1702 of a person are obliquely arranged, and a first correction area (inner area 1711 and outer area 1721) corresponding to a face 1701, and a second correction area (inner area 1712 and outer area 1722) corresponding to a face 1702 are obliquely arranged. (b) of FIG. 17 is a diagram illustrating an output image 1703 obtained by correcting the first correction area and the second correction area so as to make the faces of persons smaller. A face 1704 of a person and a face 1705 of a person in an output image 1703 respectively correspond to the face 1701 of the person and the face 1702 of the person of the input image 1700.

The face 1704 of the person and the face 1705 of the person are both corrected by the image correction processing with the same correction intensity image correction processing, but the image correction processing is anisotropic. In other words, the correction intensity is high on the lower side of the face, and is particularly configured to be highest in an obliquely downward direction. The correction intensity is low on the upper side of the face and is particularly configured to be lowest in the upward direction of the face. As a result, as illustrated in (b) of FIG. 17, the upper right portion of the face 1705 of the person, having a low correction intensity, is significantly affected by the correction of the lower left portion of the face 1704 of the person, having a high correction intensity. Thus, the upper right side of the face 1705 is significantly extended.

Thus, in the present processing example, the correction processing unit of the controller 40 adjusts the correction intensity in consideration of the direction dependency of the correction along with the positional relationship of the correction areas. Specifically, in the suppression processing, in a case that, in a direction (the specific direction) in which the correction intensity is high with respect to the first correction area corresponding to one of the faces (first target area), a second correction area corresponding to the other face (the second target area) is arranged, the correction processing unit of the controller 40 configures a higher degree of suppression for the image correction processing for the second correction area corresponding to the one of the faces (first target area) than a degree of suppression for the image correction processing for the first correction area corresponding to the other face (the second target area) (the correction intensity configuration unit 43 makes the enlargement/reduction ratios $\alpha$ and $\beta$ closer to 1).

Figure 18:
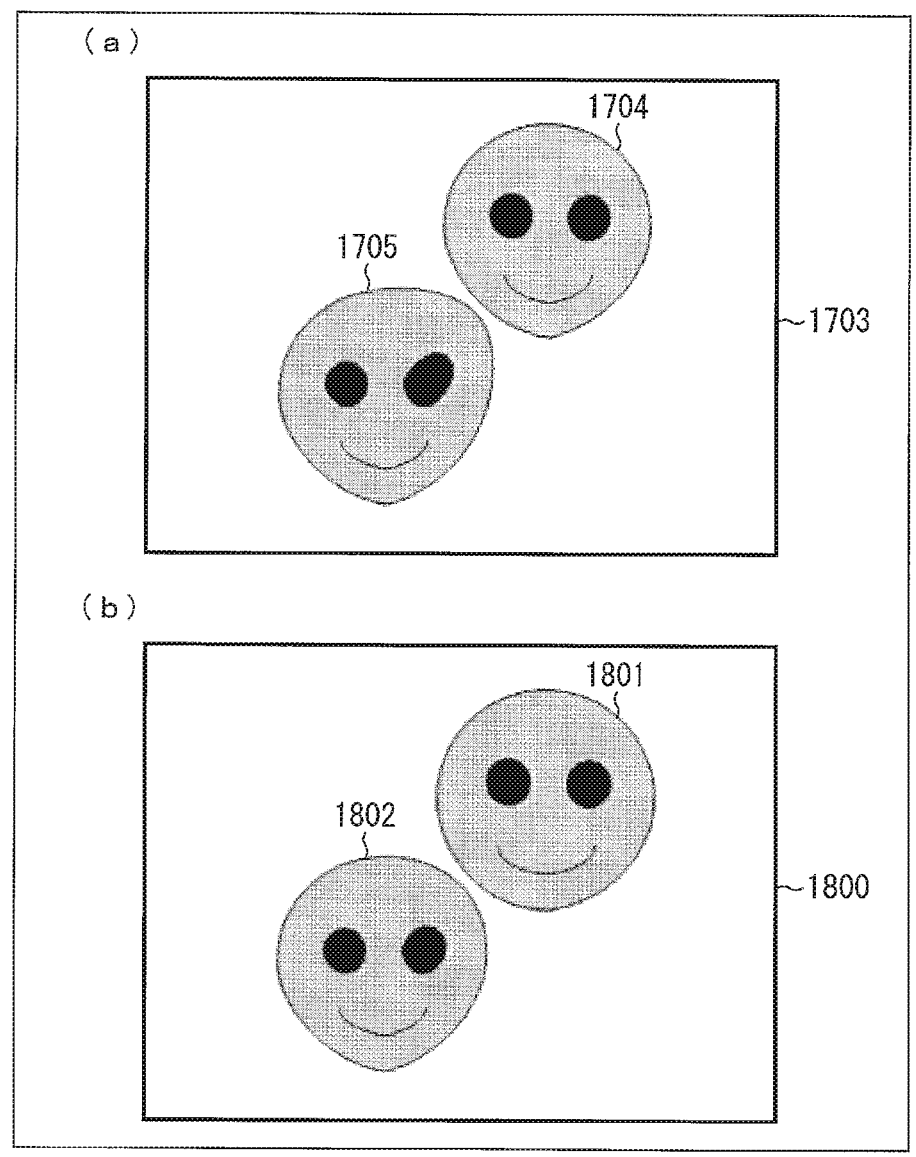
FIG. 18(a) is a diagram illustrating an output image obtained by correcting an input image so as to make faces of persons smaller with no suppression processing performed.
FIG. 18(b) is a diagram illustrating an output image obtained by performing image correction processing involving suppression processing.

Like (b) of FIG. 17, (a) of FIG. 18 is a diagram illustrating an output image 1703 obtained by performing a correction for making the faces of the persons smaller with no suppression processing performed. (b) of FIG. 18 is a diagram illustrating an output image 1800 obtained by performing the image correction processing involving the suppression processing of the present processing example. The output image 1800 illustrated in (b) of FIG. 18 is obtained by the correction processing unit of the controller 40 by reducing the correction intensity for the first correction area corresponding to the face 1701 of the person, with the correction intensity for the second correction area corresponding to the face 1702 of the person unchanged. A face 1801 of a person and a face 1802 of a person respectively correspond to the face 1701 of the person and the face 1702 of the person. A comparison between the output image 1703 and the output image 1800 indicates that, compared to the face 1705 of the person, the face 1802 of the person has the extension of the upper right portion reduced and that a preferable corrected image has been generated.

As described above, in the present embodiment, by adjusting the correction intensity, based on the positional relationship of the multiple adjacent faces (target areas), a preferable image with reduced unnatural distortion can be generated.

Supplemental Note

The "vertical direction" and "lateral direction" in the present embodiment may be the vertical direction and the lateral direction of the input image in an aspect. In an aspect, in a case that the direction at the time of imaging is associated with the input image, the vertical direction at the time of imaging is the vertical direction and the horizontal direction is the lateral direction. In another aspect, for the "vertical direction" and "lateral direction" in the present embodiment, with the inclination of the face taken into account, the up-down direction of the face may be the vertical direction, and the left and right direction of the face may be the lateral direction. Note that the method for detecting the inclination of the face is as described above.

Third Embodiment

Now, a third embodiment of the present invention will be described below, based on FIG. 19. For the sake of convenience of description, members having the same functions as those of the members described in the above embodiments are denoted by the same reference signs, and descriptions of the members are omitted. In the third embodiment, a method for narrowing the outer area in the suppression processing will be described.

Figure 19:
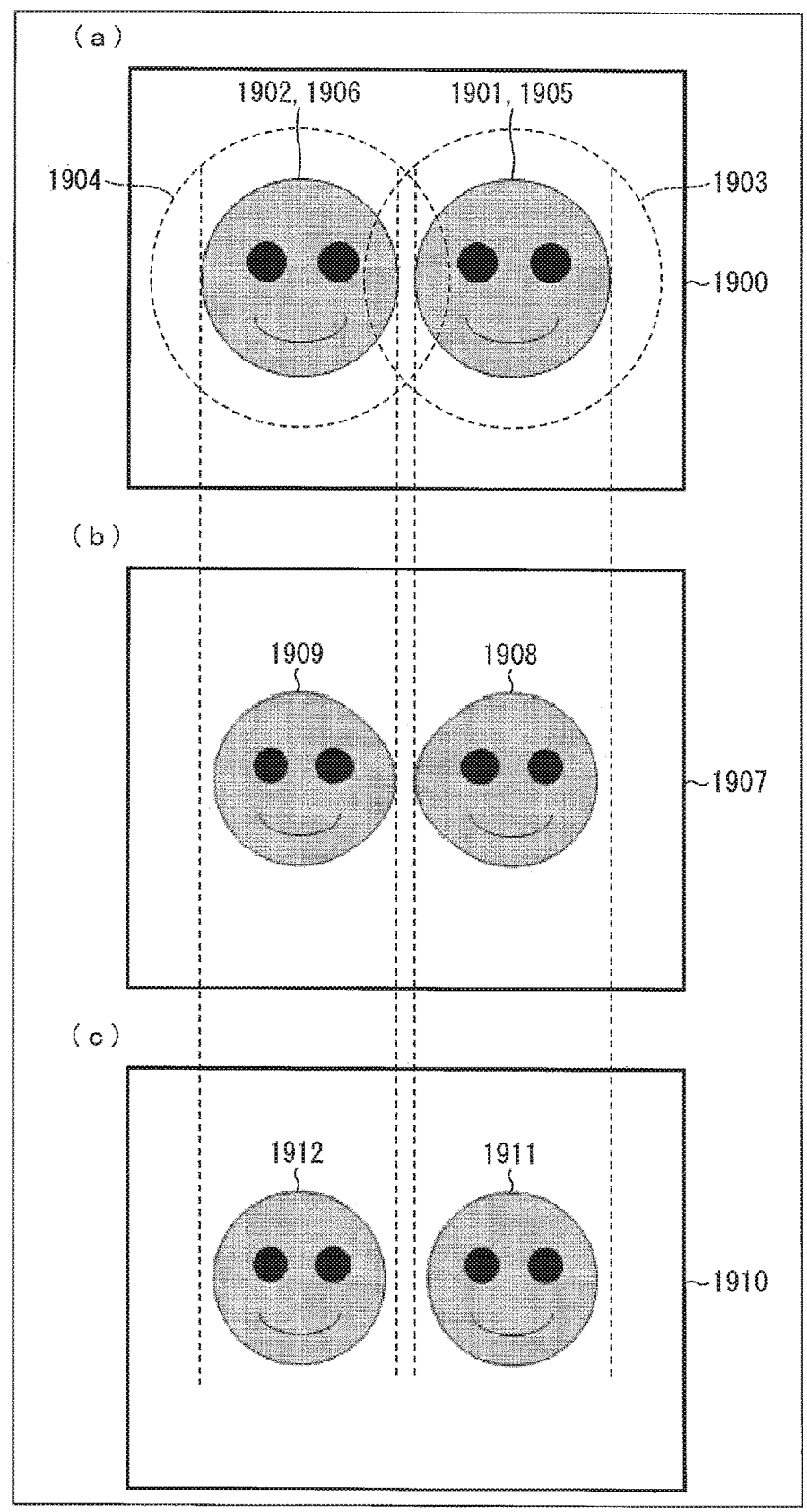
FIG. 19(a) is a diagram illustrating an input image including multiple faces as imaging objects.
FIG. 19(b) is a diagram illustrating an output image obtained by reducing both faces with no a suppression processing performed.
FIG. 19(c) is a diagram illustrating an output image obtained by performing image correction processing involving suppression processing.
Figure 20:
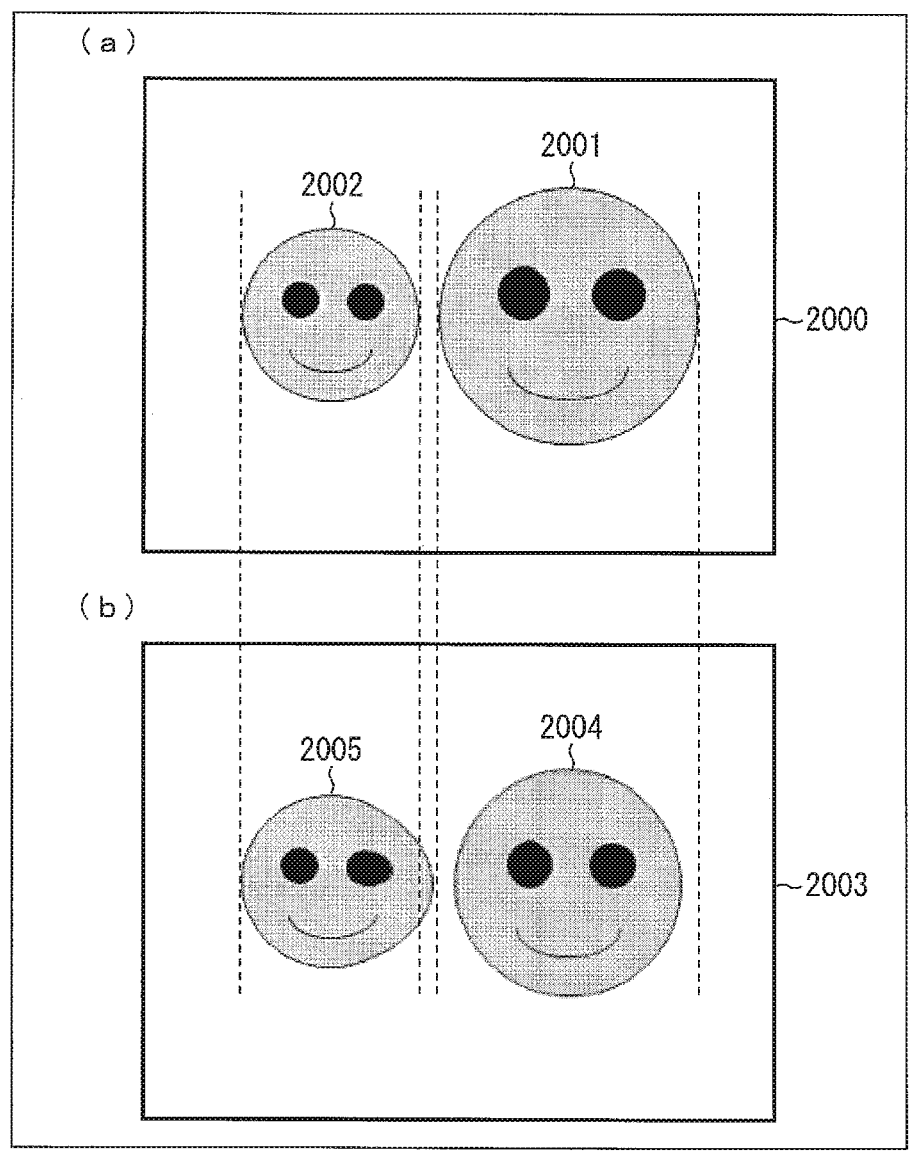
FIG. 20(a) is a diagram illustrating an input image.
FIG. 20(b) is a diagram illustrating an output image obtained by deforming the input image illustrated in FIG. 20(a) according to the prior art.

(a) of FIG. 19 is a diagram illustrating an input image 1900 including a face 1901 (first target area) of a person and a face 1902 (second target area) of a person as imaging objects. (b) of FIG. 19 is a diagram illustrating an output image 1907 obtained by correcting the input image 1900 so as to reduce the face 1901 and the face 1902 with no suppression processing performed. A face 1908 and a face 1909 in an output image 1907 respectively correspond to the face 1901 and the face 1902 in the input image 1900. (c) of FIG. 19 is a diagram illustrating an output image 1910 obtained by performing, on the input image 1900, the image correction processing involving the suppression processing according to the present embodiment. A face 1911 and a face 1912 in an output image 1910 respectively correspond to the face 1901 and the face 1902 in the input image 1900.

(a) of FIG. 19 illustrates an inner area 1905 and an outer area 1903 corresponding to the face 1901, and an inner area 1906 and an outer area 1904 corresponding to the face 1902. The outer area 1903 and the outer area 1904 overlap each other. In such a case, the area in which the outer area 1903 and the outer area 1904 overlap each other causes the corrections of the outer areas 1903 and 1904 to offset each other, and does not substantially move. Thus, as illustrated in (b) of FIG. 19, the image provides an impression that the not moving area is relatively extended.

Thus, in a case that the outer area 1903 corresponding to the face 1901 overlaps the outer area 1904 corresponding to the face 1902, the correction processing unit of the controller 40 increases, in the suppression processing, the correction intensity for the outer area of at least one of the face 1901 and the face 1902 to decrease the width of the outer area. For example, as illustrated in (a) of FIG. 19, the correction intensity configuration unit 43 corrects the enlargement/reduction rate β such that the enlargement/reduction rate β deviates from 1, thus reducing the width of the outer area 1903 down to a value at which the outer area 1903 comes into contact with the inner area 1906, and reducing the width of the outer area 1904 down to a value at which the outer area 1904 comes into contact with the inner area 1905. Thus, as illustrated in (c) of FIG. 19, each face is prevented from being overlapped by the outer area of another face, allowing each face to be favorably corrected.

Note that, in a case that the correction intensity configuration unit 43 corrects the enlargement/reduction ratio β such that the enlargement/reduction ratio β deviates from 1, correcting the enlargement/reduction ratio β to an excessively large or small value leads to an excessively deformed portion in the output image, which is thus unnatural. Accordingly, in the present embodiment, in a case of correcting the enlargement/reduction ratio β such that the enlargement/reduction ratio β deviates from 1, the correction intensity configuration unit 43 preferably limits the correction by configuring a maximum correction factor or a minimum correction factor to correct the enlargement/reduction ratio β within a predetermined range.

Implementation Examples by Software

Control blocks (in particular, the imaging object detection unit 41, the correction area configuration unit 42, the correction intensity configuration unit 43, and the image correction unit 44) of the controller (image processing apparatus) 40 may be implemented by a logic circuit (hardware) formed in, for example, an integrated circuit (IC chip) such as an Application Specific Integrated Circuit (ASIC), or a Field Programmable Gate Array (FPGA), or may be implemented by software by using a Central Processing Unit (CPU) or a Graphics Processing Unit (GPU).

In the latter case, the controller (image processing apparatus) 40 includes a CPU performing instructions of a program that is software implementing the functions, a Read Only Memory (ROM) or a storage device (these are referred to as recording media) in which the program and various data are stored to be readable by a computer (or CPU), a Random Access Memory (RAM) in which the program is deployed, and the like. The computer (or CPU) reads from the recording medium and performs the program to achieve the object of the present invention. As the above-described recording medium, a "non-transitory tangible medium" such as a tape, a disk, a card, a semiconductor memory, and a programmable logic circuit can be used. The above-described program may be supplied to the above-described computer via an arbitrary transmission medium (such as a communication network and a broadcast wave) capable of transmitting the program. Note that one aspect of the present invention may also be implemented in a form of a data signal embedded in a carrier wave in which the program is embodied by electronic transmission.

CONCLUSIONS

An image processing apparatus (controller 40) according to Aspect 1 of the present invention includes a correction processing unit (correction area configuration unit 42, correction intensity configuration unit 43, image correction unit 44) configured to perform correction processing on one or more correction areas in an image. Each of the one or more correction areas includes an inner area and an outer area outside the inner area. In the correction processing, the inner area is reduced, and the outer area is enlarged, or the inner area is enlarged, and the outer area is reduced. In a case of performing the correction processing for each of a first correction area and a second correction area, the correction processing unit determines whether to perform suppression processing of suppressing the correction processing for at least one of the first correction area or the second correction area depending on a distance between the inner area of the first correction area and the inner area of the second correction area.

According to the above-described configuration, by performing a correction for enlarging or reducing the inner areas, while performing a correction in the opposite aspect on the outer areas, the desired correction can be performed on each of the inner areas with effects on other portions of the image suppressed. By suppressing the correction processing for one or both of the inner sides depending on the distance between the inner areas, any target area can preferably avoid being excessively deformed under the effect of correction for another target area.

The image processing apparatus according to Aspect 2 of the present invention corresponds to Aspect 1, wherein the correction processing unit may perform the suppression processing in a case that the inner area of the first correction area overlaps with the outer area of the second correction area and in a case that the inner area of the second correction area overlaps with the outer area of the first correction area.

According to the above-described configuration, in a case that the inner area of a certain correction area is overlapped by the inner area or outer area of another correction area, the correction processing for one or both of the correction areas is suppressed to allow preferable avoidance of excessive deformation of the inner area of the certain correction area under the effect of the correction processing for the other correction area.

The image processing apparatus according to Aspect 3 of the present invention corresponds to Aspect 1 or 2 described above, wherein, in the suppression processing, the correction processing unit may suppress the correction processing for a larger one of the first correction area and the second correction area than the correction processing for a smaller one of the first correction area and the second correction area.

According to the configuration described above, the effect of the correction processing for the larger correction area on the smaller correction area (in particular in the inner area) is higher than the effect of the correction processing for the smaller correction area on the larger correction area (in particular in the inner area). Thus, more intensively suppressing the correction processing for the larger correction area allows preferable avoidance of excessive deformation of any of the target areas under the effect of the correction.

The image processing apparatus according to Aspect 4 of the present invention corresponds to Aspects 1 to 3 described above, wherein, in the suppression processing, the correction processing unit may change a degree of suppression of the correction processing for each of the first correction area and the second correction area in accordance with a positional relationship between the first correction area and the second correction area.

According to the unique knowledge of the inventors, the positional relationship between the two correction areas changes an impression provided by deformation resulting from the correction. According to the above-described configuration, by changing the degree of suppression of the correction in accordance with the positional relationship between the two correction areas, providing an unnatural impression due to deformation caused by the correction can be preferably avoided.

The image processing apparatus according to Aspect 5 of the present invention corresponds to Aspect 4 described above, wherein, in the suppression processing, the correction processing unit may make the degree of suppression of the correction processing for each of the first correction area and the second correction area higher in a case that the first correction area and the second correction area are arranged in juxtaposition in a lateral direction than in a case that the first correction area and the second correction area are arranged in tandem in a vertical direction.

Even in a case that the correction area is deformed slightly in the vertical direction, the left-right symmetry does not change, thus often avoiding providing an uncomfortable feeling. On the other hand, in a case that the correction area is deformed in the left and right direction, the left-right symmetry is changed, thus often leading to an unnatural impression. According to the above-described configuration, the degree of suppression is made higher in the juxtaposition state that deforms the correction area in the left and right direction than in the tandem state that deforms the correction area in the vertical direction. This allows preferable avoidance of provision of an unnatural impression.

The image processing apparatus according to Aspect 6 of the present invention corresponds to Aspect 4 or 5 described above, wherein, in the suppression processing, in a case that the first correction area and the second correction area are arranged in tandem in the vertical direction, the correction processing unit may make the degree of suppression of the correction processing for the correction area located on an upper side higher than for the correction area located on a lower side.

According to the unique knowledge of the present inventors, an unnatural impression provided by deformation of the lower correction area (in particular in the inner area) caused by the correction processing for the upper correction area is stronger than an unnatural impression provided by deformation of the upper correction area (in particular in the inner area) caused by the correction processing for the lower correction area. According to the above-described configuration, by performing more intensive suppression on the correction processing for the upper correction area than on the correction processing for the lower correction area, providing an unnatural impression can be preferably avoided.

The image processing apparatus according to Aspect 7 of the present invention corresponds to Aspects 4 to 6 described above, wherein, in a case that, in the correction processing, a degree of reduction or enlargement from a center of the correction area toward a specific direction is higher than a degree of reduction or enlargement from the center of the correction area toward another direction and that, in the suppression processing, the second correction area is arranged in the specific direction with respect to the first correction area, the correction processing unit may make the degree of suppression of the correction processing for the first correction area higher than for the second correction area.

According to the above-described configuration, since the degree of reduction or enlargement from the center of the target area toward the specific direction is high, the second target area arranged in the specific direction with respect to the first target area is significantly affected. Thus, by performing more intensive suppression of correction on the first target area than on the second target area, providing an unnatural impression can be preferably avoided.

The image processing apparatus according to Aspect 8 of the present invention corresponds to Aspects 1 to 7 described above, wherein, in the suppression processing, the correction processing unit may reduce a width of the outer area of at least one of the first correction area or the second correction area.

According to the above-described configuration, by narrowing the outer area of one of the correction areas, the effect of the correction processing for the one of the correction areas on the other correction area (in particular, in the inner area) can be reduced.

An imaging apparatus 2 according to Aspect 9 of the present invention includes an imaging unit 10, and the image processing apparatus according to any one of Aspects 1 to 8 described above, the image processing apparatus being configured to correct the image captured by the imaging unit 10.

According to the above-described configuration, a user can capture a face of a person, or the like and preferably perform image processing on the captured image.

An image printing apparatus 1 according to Aspect 10 of the present invention includes the image processing apparatus according to any one of Aspects 1 to 8 described above, and a printing unit 50 configured to print the image corrected by the image processing apparatus.

According to the above-described configuration, the user can easily print an image obtained by performing the image processing.

An image printing apparatus 1 according to Aspect 11 of the present invention includes an imaging unit 10, the image processing apparatus according to any one of Aspects 1 to 8 described above, the image processing apparatus being configured to perform image processing on the image captured by the imaging unit 10, and a printing unit 50 configured to print the image corrected by the image processing apparatus.

According to the above-described configuration, the user can easily print an image obtained by performing the image processing on the imaged image.

A method for controlling an image processing apparatus according to Aspect 12 of the present invention includes the step of performing correction processing on one or more correction areas in an image. Each of the one or more correction areas includes an inner area and an outer area outside the inner area. In the correction processing, the inner area is reduced, and the outer area is enlarged, or the inner area is enlarged, and the outer area is reduced. In the step of correction processing, in a case that the correction processing is performed for each of a first correction area and a second correction area, whether to perform suppression processing of suppressing the correction processing for at least one of the first correction area or the second correction area is determined depending on a distance between the inner area of the first correction area and the inner area of the second correction area.

According to the above-described configuration, effects are produced that are similar to those of the image processing apparatus according to an aspect of the present invention.

The image processing apparatus according to each of the aspects of the present invention may be implemented by a computer. In this case, the present invention embraces also an image processing program that implements the above image processing apparatus by a computer by causing the computer to operate as each of the units (software elements) included in the above image processing apparatus, and a computer-readable recording medium in which the program is recorded.

Supplemental Note

The present invention is not limited to each of the above-described embodiments. It is possible to make various modifications within the scope of the claims. An embodiment obtained by appropriately combining technical elements each disclosed in different embodiments falls also within the technical scope of the present invention. Further, a combination of technical elements disclosed in the respective embodiments allows formation of a new technical feature.

CROSS-REFERENCE OF RELATED APPLICATION

This application claims the benefit of priority to JP 2017-084787 filed on Apr. 21, 2017, which is incorporated herein by reference in its entirety.

REFERENCE SIGNS LIST

1 Image printing apparatus
2 Imaging apparatus
10 Imaging unit
40 Controller (image processing apparatus)
41 Imaging object detection unit (target area detection unit)
42 Correction area configuration unit (correction processing unit)
43 Correction intensity configuration unit (correction processing unit)
44 Image correction unit (correction processing unit)
50 Printing unit

The invention claimed is:

1. An image processing apparatus comprising:
correction processing circuitry configured to perform correction processing on a first correction area and a second correction area in an image, wherein
the first correction area and the second correction area respectively includes an inner area and an outer area outside the inner area, and in the correction processing, the inner area is reduced and the outer area is enlarged, or the inner area is enlarged and the outer area is reduced,
in a case of performing the correction processing for the first correction area and the second correction area, the correction processing circuitry perform suppression processing of suppressing the correction processing for at least one of the first correction area or the second correction area, and
in the suppression processing, the correction processing circuitry make the degree of suppression of the correction processing for the first correction area and the second correction area higher in a case that the first correction area and the second correction area are arranged in juxtaposition in a lateral direction than in a case that the first correction area and the second correction area are arranged in tandem in a vertical direction.

2. The image processing apparatus according to claim 1, wherein
the correction processing circuitry perform the suppression processing in a case that the inner area of the first correction area overlaps with the outer area of the second correction area and in a case that the inner area of the second correction area overlaps with the outer area of the first correction area.

3. The image processing apparatus according to claim 1, wherein
in the suppression processing, the correction processing circuitry suppress the correction processing for a larger one of the first correction area and the second correction area than the correction processing for a smaller one of the first correction area and the second correction area.

4. The image processing apparatus according to claim 1, wherein
in the suppression processing, in a case that the first correction area and the second correction area are arranged in tandem in the vertical direction, the correction processing circuitry make the degree of suppression of the correction processing for the correction area located on an upper side higher than for the correction area located on a lower side.

5. The image processing apparatus according to claim 1, wherein,
in a case that, in the correction processing, a degree of reduction or enlargement from a center of the correction area toward a specific direction is higher than a degree of reduction or enlargement from the center of the correction area toward another direction and that
in the suppression processing, the second correction area is arranged in the specific direction with respect to the first correction area, the correction processing circuitry make the degree of suppression of the correction processing for the first correction area higher than for the second correction area.

6. The image processing apparatus according to claim 1, wherein
in the suppression processing, the correction processing circuitry reduce a width of the outer area of at least one of the first correction area or the second correction area.

7. A method for controlling an image processing apparatus, the method comprising a step of performing correction processing on a first correction area and a second correction area in an image, wherein
the first correction area and the second correction area respectively includes an inner area and an outer area outside the inner area, in the correction processing, the inner area is reduced and the outer area is enlarged, or the inner area is enlarged and the outer area is reduced,
in the step of correction processing, in a case that the correction processing is performed on the first correction area and the second correction area, suppression processing of suppressing the correction processing for at least one of the first correction area or the second correction area is performed, and
in the step of correction processing, in the suppression processing, the degree of suppression of the correction processing for the first correction area and the second correction area is made higher in a case that the first correction area and the second correction area are arranged in juxtaposition in a lateral direction than in a case that the first correction area and the second correction area are arranged in tandem in a vertical direction.

8. A non-transitory recording medium containing an image processing program causing a computer to operate as a correction processing circuitry performing correction processing on a first correction area and a second correction area in an image, wherein
the first correction area and the second correction area includes an inner area and an outer area outside the inner area, and in the correction processing, the inner area is reduced and the outer area is enlarged, or the inner area is enlarged and the outer area is reduced,
in a case of performing the correction processing for the first correction area and the second correction area, the correction processing circuitry perform suppression processing of suppressing the correction processing for at least one of the first correction area or the second correction area, and
in the suppression processing, the correction processing circuitry make the degree of suppression of the correction processing for the first correction area and the second correction area higher in a case that the first correction area and the second correction area are arranged in juxtaposition in a lateral direction than in a case that the first correction area and the second correction area are arranged in tandem in a vertical direction.

9. The image processing apparatus according to claim 1, wherein
the correction processing circuitry determine whether to perform the suppression processing depending on a distance between the inner area of the first correction area and the inner area of the second correction area.

* * * * *